(12) United States Patent
Lv et al.

(10) Patent No.: US 12,416,127 B2
(45) Date of Patent: *Sep. 16, 2025

(54) CONSTRUCTION METHOD FOR ECOLOGICAL RIPRAP BREAKWATER, INDUCED CEMENT-BASED COATING AND PREPARATION METHOD THEREOF

(71) Applicant: Jianfu Lv, Harbin (CN)

(72) Inventors: Jianfu Lv, Harbin (CN); Yihong Guo, Harbin (CN); Fei Xu, Harbin (CN); Xinyu Hu, Harbin (CN)

(73) Assignee: Jianfu LV, Harbin (CN)

( * ) Notice: Subject to any disclaimer, the term of this patent is extended or adjusted under 35 U.S.C. 154(b) by 554 days.

This patent is subject to a terminal disclaimer.

(21) Appl. No.: 17/831,294

(22) Filed: Jun. 2, 2022

(65) Prior Publication Data

US 2022/0307213 A1 Sep. 29, 2022

Related U.S. Application Data

(63) Continuation of application No. PCT/CN2020/133082, filed on Dec. 1, 2020.

(30) Foreign Application Priority Data

Dec. 2, 2019 (CN) .......................... 201911210502.6
Dec. 2, 2019 (CN) .......................... 201911210521.9

(51) Int. Cl.
*E02B 3/06* (2006.01)
*A01K 61/54* (2017.01)
(Continued)

(52) U.S. Cl.
CPC ............. *E02B 3/066* (2013.01); *A01K 61/54* (2017.01); *C04B 14/28* (2013.01); *C04B 28/04* (2013.01)

(58) Field of Classification Search
CPC ........... E02B 3/066; E02B 3/06; A01K 61/54; C04B 14/28; C04B 28/04;
(Continued)

(56) References Cited

U.S. PATENT DOCUMENTS 7,144,196 B1 * 12/2006 Campbell ............... E02B 3/046
119/221
7,565,883 B2 * 7/2009 Greenfield ............. A01K 63/04
119/268
(Continued)

FOREIGN PATENT DOCUMENTS

CN 104938384 A * 9/2015 ............. A01K 61/70
CN 105462305 A 4/2016
(Continued)

OTHER PUBLICATIONS

Scyphers et al. (Oyster reefs as natural breakwaters mitigate shoreline loss and facilitate fisheries, PloS ONE 6(8): e22396. doi: 10.1371/journal.pone.0022396, Aug. 2011) (Year: 2011).*
(Continued)

*Primary Examiner* — Amber R Orlando
*Assistant Examiner* — Anastasia A. Kuvayskaya
(74) *Attorney, Agent, or Firm* — Arch & Lake LLP

(57) ABSTRACT

Disclosed are a cement coating for inducing the settlement of marine sessile organisms and an application technology therefor, and, in particular, a construction method for an ecological riprap breakwater, an induced cement-based coating, and a preparation method thereof. The cement coating for inducing the settlement of marine sessile organisms is coated on surfaces of rocks, and a reasonable spatial layout is applied, such that each rock pile (block) can effectively break waves and ensure smooth exchange between water bodies on two sides. After oysters attached to each rock pile (block) breed a large amount, the water bodies can be purified, and the ecological environment in the surrounding sea area can be improved.

12 Claims, 4 Drawing Sheets

Main view  Top view

(51) Int. Cl.
*C04B 14/00* (2006.01)
*C04B 14/28* (2006.01)
*C04B 28/04* (2006.01)

(58) Field of Classification Search
CPC ......... C04B 2111/00758; C04B 28/065; C04B 1/027; C04B 18/18; C04B 20/1037; C04B 2/142; C04B 24/2641; C04B 2/06; C04B 28/08; Y02A 10/11; B28B 1/52; B28B 11/245; B28C 5/003
See application file for complete search history.

(56) References Cited

U.S. PATENT DOCUMENTS

| | | | |
|---|---|---|---|
| 2010/0144521 A1* | 6/2010 | Constantz | C01F 5/24 423/430 |
| 2013/0152827 A1* | 6/2013 | Ripandelli | C09C 1/24 106/806 |
| 2015/0366170 A1* | 12/2015 | Finkel | A01K 61/00 47/1.01 R |
| 2018/0049410 A1 | 2/2018 | Lindquist et al. | |

FOREIGN PATENT DOCUMENTS

| | | | | |
|---|---|---|---|---|
| CN | 111268960 A | 6/2020 | | |
| CN | 111270648 A | 6/2020 | | |
| CN | 111320935 A | 6/2020 | | |
| CN | 111321699 A | 6/2020 | | |
| KR | 20150140258 A | * 12/2015 | ........... | A01K 31/002 |
| KR | 102016558 B1 | * 9/2019 | ......... | C04B 20/0048 |

OTHER PUBLICATIONS

Wallace et al. (Cultivating the Eastern oyster, *Crassostrea virginica*, SRAC Publication No. 432, Aug. 2001) (Year: 2001).*
KR 102016558 B1 Machine Translation (Year: 2019).*
CN 104938384 A Machine Translation (Year: 2015).*
KR 20150140258 Machine Translation (Year: 2015).*
International Search Report of PCT/CN2020/133082 dated Mar. 3, 2021 with English translation, (6p).

* cited by examiner

Sulfate cement concrete        Silica fume cement concrete

Main view Top view

Main view

Top view

CONSTRUCTION METHOD FOR ECOLOGICAL RIPRAP BREAKWATER, INDUCED CEMENT-BASED COATING AND PREPARATION METHOD THEREOF

CROSS-REFERENCE TO RELATED APPLICATIONS

This application is a continuation of a PCT application PCT/CN2020/133082 filed on Dec. 1, 2020, which claims the priority of a Chinese patent application 201911210502.6 filed on Dec. 2, 2019; and, a Chinese patent 201911210521.9 filed on Dec. 2, 2019, and the entire disclosures of which are incorporated by reference in this application for all purposes.

TECHNICAL FIELD

The present disclosure relates to an ecological break water technology, particularly relates to a construction method for ecological riprap breakwater, and an induced cement-based coating and preparation method thereof, and belongs to the field of marine ecological engineering.

BACKGROUND

In recent decades, the rapid development of coastal economy and neglect of environmental protection have caused large-scale destruction of coastal ecology, and have had a huge impact on the ecology and economy of coastal areas in China. At present, with the introduction of a series of related national policies, marine engineering construction in China will come to a peak period, but large-scale marine engineering construction and breakwaters for guaranteeing the stability of surrounding sea areas further destroy the fragile ecosystem of the sea. If appropriate ecological environment protection cannot be performed, larger disasters will be brought to the ecology of the ocean coasts. Meanwhile, most coastal infrastructures cannot be dismantled, and the ecology of the sea areas where the infrastructures are located needs to be restored, people gradually have the consciousness of applying the ecological technology on a large number of infrastructures to effectively improve or restore the ecology of the sea areas. Therefore, it is very important and urgent to construct breakwaters with good ecological effect or perform ecologicalization on existing breakwater to improve the offshore ecological environment at present.

SUMMARY

An objective of the present disclosure is to provide a construction method for a high-durability ecological riprap breakwater to solve the problems that the coastal ecology is damaged by expansion and restoration of a current breakwater and the service cycle of the current breakwater is short. With the adoption of the method of the present disclosure, the breakwater has a good wave absorbing function, a long-term service capacity and excellent ecological benefits. According to the present disclosure, the methods of designing, molding and maintaining of coatings and concrete for inducing settlement of oysters are determined according to the fact that the oysters prefer to settle on the dark substrate surfaces and the surfaces of similar shells, high alkalinity could affect settlement and metamorphosis of the oysters, and meanwhile, the influence of externally-added substances on the properties of the cement-based coatings and the concrete is considered.

The specific technical solution is as follows:

(1) surveying a sea area of a breakwater construction position: surveying dominant species of oysters in the sea area and whether the oysters are attached, surveying air temperature, seawater temperature, dissolved oxygen, plankton, total dissolved inorganic nitrogen, active phosphate, active silicate, $Ca^{2+}$, $Zn2+$, $K+$ and the like for the sea area at different seasons, and surveying typhoon times, strength and the like over the years;

(2) preparing a concrete settlement substrate: wherein the shape of the concrete oyster settlement substrate is one of the shapes of a slab-shaped settlement substrate, a wave-shaped settlement substrate and a cylindrical settlement substrate;

(3) quantitative collecting and cultivating oyster larvae: placing the settlement substrate in a larva collection area of local sea area, where the swimming larvae are mainly in metamorphosis period, stopping collecting the larvae once the amount of the settled oyster larvae is 15-25 larvae/100 cm2, and then moving the settlement substrate to a sea area with rich baits for floating cultivation;

(4) treating rock surface: cleaning rock surface, spraying or painting a cement-based coating for inducing the settlement of marine sessile organisms for marine engineering surface when rock surface is saturated surface dry condition;

(5) placing rocks: in the concentration period of settlement and metamorphosis of oyster planktonic larvae in the local sea area of the next year, adopting a dispersed placement method, placing the rocks with volume of more than 1 $m^3$ individually, and covering each rock with a rope; covering multiple rocks with the volume of less than 1 m3 with ropes to form a rock pile with a volume of 1-5 m3, wherein the internal void age is 40%-60%; and connecting the rocks by ropes;

(6) placing the oyster settlement substrate in site: conveying the oyster settlement substrate in which the gonad of oysters develops into mature stage in the step (3) to the sea area for constructing the break water, placing one lightweight concrete settlement substrate with the rough surface for oyster on single rock or rock pile and fixing single rock or rock pile through a rope; in addition, feeding algae or replenishing nutritive salts if necessary according to the planktonic condition of the local sea area; and (7) monitoring and managing the state of larval settlement: monitoring the settlement condition of oyster larvae on the rock surface; when the larval settlement density is 30 to 40 larvae/100 cm2, moving away the oyster settlement substrate, monitoring the ecological condition of a breakwater for a long time, and providing corresponding measures according to the practical condition.

The lightweight concrete settlement substrate with the rough surface for oyster as described in the specific measure in the step (2) comprises the following material components in percentage by weight: 21.8-34.5% of the cementations' material, 24.6-37.5% of lightweight coarse aggregate, 15.8-29.6% of lightweight fine aggregate, 8.4-16.4% of water, 0.6-3.0% of the dark pigment, 0.4-2.0% of biological calcium powder, 0.4-2.0% of calcium carbonate powder, 0.2-1.8% of trace elements, 0.15-1.5% of chopped fibers and 0.03-0.18% of the superplasticizer.

DETAILED DESCRIPTION OF EMBODIMENTS

Figure 1:
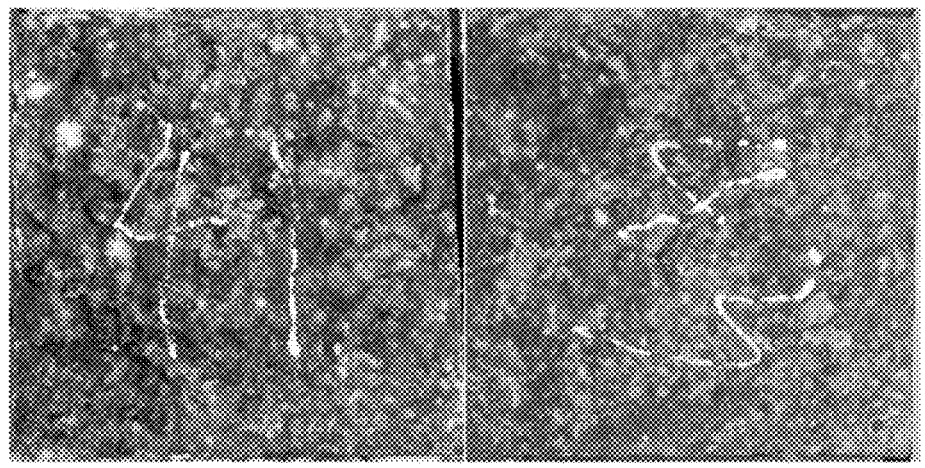
FIG. 1 shows mildewing condition on a surface of different concrete mix with 10% bovine bone powder (under standard curing)

The present disclosure would be described in detail below by means of Examples, which were only used to illustrate the present disclosure and did not limit the scope of the present disclosure. The specific technical solution steps of the project plan was as follows:

Example 1

(1) Surveying of a sea area of a breakwater construction position: the dominant species of oysters in the sea area and whether the oysters were settled were surveyed; the test was performed 15 times in each season, and the air temperature, seawater temperature, dissolved oxygen, plankton, total dissolved 10 inorganic nitrogen, active phosphate, active silicate, $Ca^{2+}$, $Zn^{2+}$, $K^+$ and the like in the sea area were recorded; the typhoon times, strength and the like over the years were surveyed; the meteorological and hydrological data of the sea area for many years were looked up; and a feasible method and a solution for constructing an ecological riprap breakwater were analyzed.

(2) Manufacturing of a concrete settlement substrate: A lightweight concrete oyster settlement substrate with a rough surface was manufactured using ecological concrete, the size of the settlement substrate was 10 cm×10 cm×2 cm, after demolding, curing with $CO_2$ was carried out under 10 atmospheric pressures for 1 h, and then standard curing was carried out for 28 d.

(3) Regular and quantitative collecting and cultivating of oyster larvae: The settlement substrate with the rough surface was placed in a larva collection area of a nearby sea area in July, the collection of the larvae was stopped when the amount of settled oyster larvae was 20 larvae/100 cm2, and then the settlement substrate was moved to a sea area with rich baits for floating cultivation.

(4) Treating of rock surface: examining the rock surface, cleaning rock surface with debris and chemical contaminations, painting a cement-based coating for inducing the settlement of marine sessile organisms for marine engineering surface when rock surface was saturated surface dry condition;

(5) Placing of rocks: in June of the next year, adopting a dispersed placement method, placing the rocks with volume of more than 1 m3 individually, and covering each rock with a rope; covering multiple rocks with the volume of less than 1 m3 with the ropes to form a rock pile with a volume of 1-5 m3, wherein the internal voidage was 50%; and connecting the rocks and the rock piles 30 by ropes, and keeping the distance between every two rocks (piles) at 4 m;

(6) Placing of the oyster settlement substrate in site: conveying the oyster settlement substrate where oysters (the gonad of oysters developed into mature stage) were well settled on the concrete surface to the sea area for constructing the breakwater, placing one oyster settlement substrate on single rock or rock pile and fixing single rock or rock pile through a rope; and (7) Monitoring and managing the state of the larva settlement: When the settlement density of the oyster larvae on the rock surface was 35 larvae/100 cm2 by monitoring, the oyster settlement substrate was moved away, and meanwhile, the type and quantity of plankton in the sea area were monitored to decide whether to continue to put in bait.

Example 2

(1) Surveying of a sea area of a breakwater construction position: The dominant species of oysters in the sea area and whether the oysters were settled were surveyed; the test was performed 15 times in each season, and the air temperature, seawater temperature, dissolved oxygen, plankton, total dissolved inorganic nitrogen, active phosphate, active silicate, $Ca^{2+}$, $Zn^{2+}$, $K^+$ and the like in the sea area were recorded; the typhoon times, strength and the like over the years were surveyed; the meteorological and hydrological data of the sea area for many years were looked up; and a feasible method and a solution for constructing an ecological riprap breakwater were analyzed;

(2) Manufacturing of a concrete settlement substrate: A lightweight concrete oyster settlement substrate with a rough surface was manufactured using ecological concrete, the size of the settlement substrate was 10 cm×10 cm×3 cm, after demolding, curing with $CO_2$ was carried out under 10 atmospheric pressures for 1.5 h, and then standard curing was carried out for 28 d;

(3) Regular and quantitative collecting and cultivating of oyster larvae: The settlement substrate with the rough surface was placed in a larva collection area of a nearby sea area in August, the collection of the larvae was stopped when the amount of settled oyster larvae was 25 larvae/100 cm2, and then the settlement substrate was moved to a sea area with rich baits for floating cultivation.

(4) Treating of rock surface: examining the rock surface, cleaning rock surface with debris and chemical contamination, painting a cement-based coating for inducing the settlement of marine sessile organisms for marine engineering surface when rock surface was saturated surface dry condition;

(5) Placing of rocks: in July of the next year, adopting a dispersed placement method, placing the rocks with volume of more than 1 m3 individually, and covering each rock with a rope; covering multiple rocks with the volume of less than 1 m3 with the ropes to form a rock pile with a volume of 1-5 $m^3$, wherein the internal voidage was 60%; and connecting the rocks and the rock piles by ropes, and keeping the distance between every two rocks (piles) at 5 m;

(6) placing the oyster settlement substrate in site: conveying the oyster settlement substrate where oysters (the gonad of oysters developed into mature stage) were well settled on the concrete surface to the sea area for constructing the breakwater, placing one oyster settlement substrate on single rock or rock pile and fixing single rock or rock pile through a rope; and (7) Monitoring and managing the state of the larva settlement: When the settlement density of the oyster larvae on the rock surface was 40 larvae/100 cm² by monitoring, the oyster settlement substrate was moved away, and meanwhile, the type and quantity of plankton in the sea area were monitored to decide whether to continue to put in bait.

Figure 5:
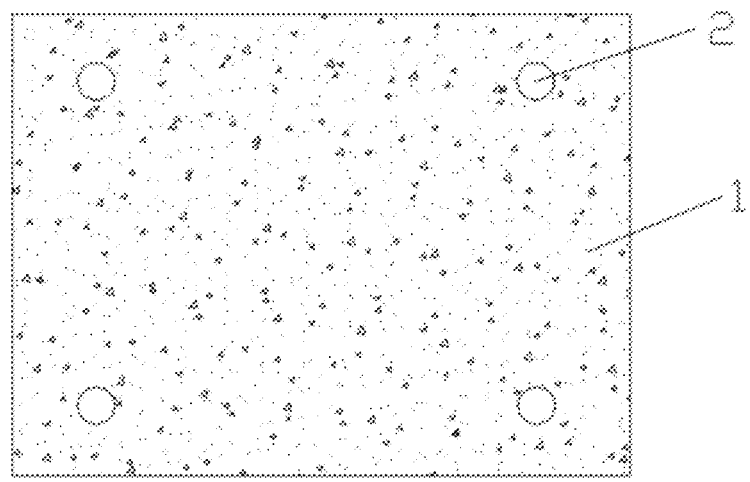
FIG. 5 is a schematic diagram of a concrete oyster settlement substrate.
Figure 6:
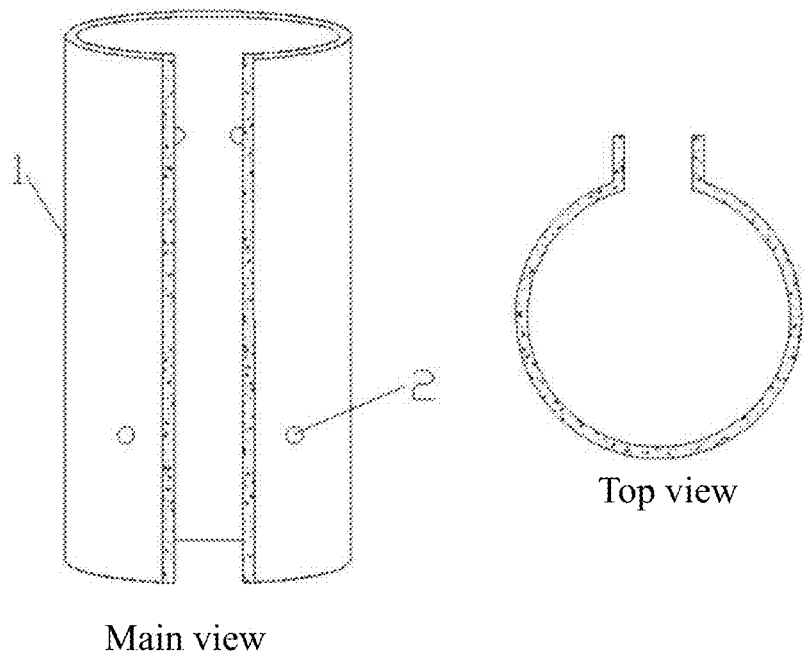
FIG. 6 is a schematic diagram of a concrete oyster settlement substrate.
Figure 7:
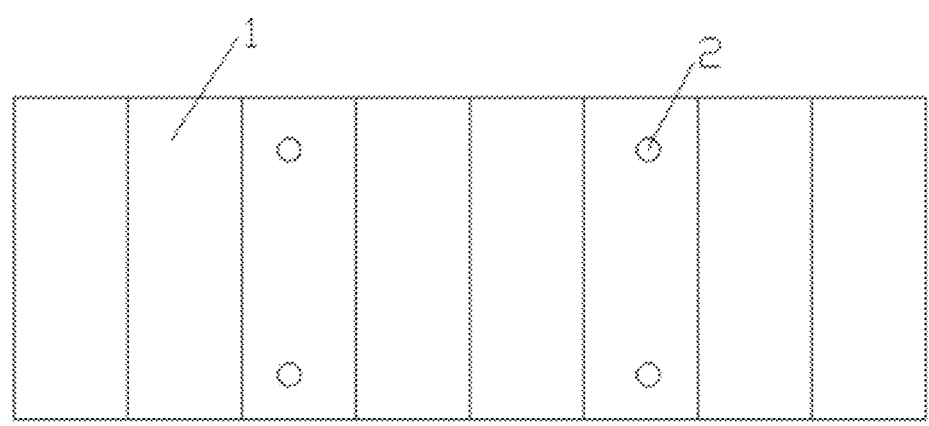
FIG. 7 is a schematic diagram of a concrete oyster settlement substrate.
Figure 7:

The mix of the settlement substrate for oyster and cement-based coating in the Examples 1 and 2 was as follows, and the shape design of the concrete settlement substrate for oyster was specifically shown in FIGS. 5-7.

The concrete mix of the lightweight concrete settlement substrate with the rough surface for oyster (1-25), and the mix of cement-based coating for inducing the settlement of sessile organisms for marine engineering surface (26-35).

Example 1: According to the concrete mix of ordinary Portland cement, the mix ratios by weight of ordinary Portland cement, lightweight coarse aggregate, lightweight fine aggregate, water and polycarboxylate superplasticizer powder were 29.37%, 33.53%, 24.48%, 12.59% and 0.03% in a sequence.

Wherein the lightweight coarse aggregate was one or two of crushed lightweight porous basalt and lightweight ceramsite of which the maximum particle size was less than 20 mm. The lightweight fine aggregate was one or two of crushed zeolite and lightweight ceramic sand, had the particle size of 0.2 to 5 mm and was well graded. The water should meet the concrete water standard (JGJ63-2006), the Cl-content was less than 1,000 mg/L, the pH value was more than 4.5, and the influence on the initial setting time, final setting time, strength and permeability of cement was small. In the Examples 1 to 25, the above materials were the same.

Example 2: According to the reference concrete mix, the mix ratios by weight of ordinary Portland cement, silica fume, blast furnace slag powder, lightweight coarse aggregate, lightweight fine aggregate, water and polycarboxylate superplasticizer powder were 17.62%, 1.47%, 10.28%, 33.53%, 24.48%, 12.59% and 0.03% in a sequence.

Example 3: The mix ratio by weight of an unmodified dark pigment, ordinary Portland cement, silica fume, blast furnace slag powder, lightweight coarse aggregate, lightweight fine aggregate, water and polycarboxylate superplasticizer powder were 0.87%, 17.62%, 1.36%, 9.52%, 33.57%, 24.48%, 12.59% and 0.03% in a sequence.

Example 4: The mix ratio by weight of an unmodified dark pigment, ordinary Portland cement, silica fume, blast furnace slag powder, lightweight coarse aggregate, lightweight fine aggregate, water and polycarboxylate superplasticizer powder were 1.47%, 17.62%, 1.28%, 8.99%, 33.57%, 24.48%, 12.59% and 0.03% in a sequence.

Example 5: The mix ratio by weight of an unmodified dark pigment, ordinary Portland cement, silica fume, blast furnace slag powder, lightweight coarse aggregate, lightweight fine aggregate, water and polycarboxylate superplasticizer powder were 2.35%, 17.62%, 1.18%, 8.23%, 33.57%, 24.48%, 12.59% and 0.03% in a sequence.

Example 6: The mix ratio by weight of a modified dark pigment (the mass ratio of iron oxide black to an aniline black mixture was 1:1), ordinary Portland cement, silica fume, blast furnace slag powder, lightweight coarse aggregate, lightweight fine aggregate, water and polycarboxylate superplasticizer powder were 0.87%, 17.62%, 1.36%, 9.52%, 33.57%, 24.48%, 12.59% and 0.03% in a sequence.

Example 7: The mix ratio by weight of a modified dark pigment (the mass ratio of iron oxide black to an aniline black mixture was 1:1), ordinary Portland cement, silica fume, blast furnace slag powder, lightweight coarse aggregate, lightweight fine aggregate, water and polycarboxylate superplasticizer powder were 1.47%, 17.62%, 1.28%, 8.99%, 33.57%, 24.48%, 12.59% and 0.03% in a sequence.

Example 8: The mix ratio by weight of a modified dark pigment (the mass ratio of iron oxide black to an aniline black mixture was 1:1), ordinary Portland cement, silica fume, blast furnace slag powder, lightweight coarse aggregate, lightweight fine aggregate, water and polycarboxylate superplasticizer powder were 2.35%, 17.62%, 1.18%, 8.23%, 33.57%, 24.48%, 12.59% and 0.03% in a sequence.

Wherein the modified dark pigment was prepared by the following steps: mixing 196 transparent resin, 3% of a hardener and 1.5% of an accelerator, wherein the volume ratio of the pigment to the resin was 1:0.2, curing at a normal temperature for 4 h, curing at 60° C. for 4 h, breaking, and grinding with a vibration mill until the fineness was greater than 400 meshes.

Example 9: The mix ratio by weight of calcium carbonate powder, ordinary Portland cement, silica fume, blast furnace slag powder, lightweight coarse aggregate, lightweight fine aggregate, water and polycarboxylate superplasticizer powder were 0.87%, 17.62%, 1.36%, 9.52%, 33.57%, 24.48%, 12.59% and 0.03% in a sequence.

Example 10: The mix ratio by weight of calcium carbonate powder, ordinary Portland cement, silica fume, blast furnace slag powder, lightweight coarse aggregate, lightweight fine aggregate, water and polycarboxylate superplasticizer powder were 1.47%, 17.62%, 1.28%, 8.99%, 33.57%, 24.48%, 12.59% and 0.03% in a sequence.

Example 11: The mix ratio by weight of calcium carbonate powder, ordinary Portland cement, silica fume, blast furnace slag powder, lightweight coarse aggregate, lightweight fine aggregate, water and polycarboxylate superplasticizer powder were 2.35%, 17.62%, 1.18%, 8.23%, 33.57%, 24.48%, 12.59% and 0.03% in a sequence.

Example 12: The mix ratio by weight of a modified dark pigment (the mass ratio of iron oxide black to an aniline black mixture was 1:1), calcium carbonate powder, ordinary Portland cement, silica fume, blast furnace slag powder, lightweight coarse aggregate, lightweight fine aggregate, water and polycarboxylate superplasticizer powder were 1.47%, 0.87%, 17.62%, 1.18%, 8.23%, 33.57%, 24.48%, 12.59% and 0.03% in a sequence.

Example 13: The mix ratio by weight of a modified dark pigment (the mass ratio of iron oxide black to an aniline black mixture was 1:1), calcium carbonate powder, ordinary Portland cement, silica fume, blast furnace slag powder, lightweight coarse aggregate, lightweight fine aggregate, water and polycarboxylate superplasticizer powder were 1.47%, 1.47%, 17.62%, 1.10%, 7.71%, 33.57%, 24.48%, 12.59% and 0.03% in a sequence.

Example 14: The mix ratio by weight of a modified dark pigment (the mass ratio of iron oxide black to an aniline black mixture was 1:1), calcium carbonate powder, ordinary Portland cement, silica fume, blast furnace slag powder, lightweight coarse aggregate, lightweight fine aggregate, water and polycarboxylate superplasticizer powder were 1.47%, 2.35%, 17.62%, 0.99%, 6.94%, 33.57%, 24.48%, 12.59% and 0.03% in a sequence.

Example 15: The mix ratio by weight of unmodified bovine bone powder, ordinary Portland cement, silica fume, blast furnace slag powder, lightweight coarse aggregate, lightweight fine aggregate, water and polycarboxylate superplasticizer powder were 0.87%, 17.62%, 1.36%, 9.52%, 33.57%, 24.48%, 12.59% and 0.03% in a sequence.

Example 16: The mix ratio by weight of unmodified bovine bone powder, ordinary Portland cement, silica fume, blast furnace slag powder, lightweight coarse aggregate, lightweight fine aggregate, water and polycarboxylate superplasticizer powder were 1.47%, 17.62%, 1.28%, 8.99%, 33.57%, 24.48%, 12.59% and 0.03% in a sequence.

Example 17: The mix ratio by weight of unmodified bovine bone powder, ordinary Portland cement, silica fume, blast furnace slag powder, lightweight coarse aggregate, lightweight fine aggregate, water and polycarboxylate superplasticizer powder were 2.35%, 17.62%, 1.18%, 8.23%, 33.57%, 24.48%, 12.59% and 0.03% in a sequence.

Example 18: The mix ratio by weight of modified bovine bone powder, ordinary Portland cement, silica fume, blast furnace slag powder, lightweight coarse aggregate, lightweight fine aggregate, water and polycarboxylate superplasticizer powder were 0.87%, 17.62%, 1.36%, 9.52%, 33.57%, 24.48%, 12.59% and 0.03% in a sequence.

Example 19: The mix ratio by weight of modified bovine bone powder, ordinary Portland cement, silica fume, blast furnace slag powder, lightweight coarse aggregate, lightweight fine aggregate, water and polycarboxylate superplasticizer powder were 1.47%, 17.62%, 1.28%, 8.99%, 33.57%, 24.48%, 12.59% and 0.03% in a sequence.

Example 20: The mix ratio by weight of modified bovine bone powder, ordinary Portland cement, silica fume, blast furnace slag powder, lightweight coarse aggregate, lightweight fine aggregate, water and polycarboxylate superplasticizer powder were 2.35%, 17.62%, 1.18%, 8.23%, 33.57%, 24.48%, 12.59% and 0.03% in a sequence.

A bovine bone powder modification method comprises the following steps: adding 100-mesh bovine bone powder into a phosphoric acid solution with the concentration of 2%, wherein the weight ratio of the bovine bone powder to the phosphoric acid solution was 1:3, and the temperature was 20-30° C.; stirring in a stirrer at a rotating speed of 200-500 rpm for 30 min, centrifuging for 3 min by adopting a centrifugal machine at a rotating speed of 3,000-5,000 rpm, pouring out the supernatant, and washing the centrifuged solid substance for 2-3 times by using water until washing water did not show acidity anymore; and performing vacuum drying on the centrifuged solid substance at the temperature of 40° C., grinding the dried bovine bone powder and slag powder in a mass ratio of 1:4 by using a vibration mill until the fineness was more than 200 meshes, and standing for later use.

Example 21: The mix ratio by weight of calcium carbonate powder, zinc sulfate, a modified dark pigment (the mass ratio of iron oxide black to an aniline black mixture was 1:1), ordinary Portland cement, blast furnace slag powder, silica fume, lightweight coarse aggregate, lightweight fine aggregate, water and polycarboxylate superplasticizer powder were 2.35%, 0.5%, 1.47%, 17.62%, 0.93%, 6.50%, 33.57%, 24.48%, 12.59% and 0.03% in a sequence.

Example 22: The mix ratio by weight of calcium carbonate powder, zinc sulfate, a modified dark pigment (the mass ratio of iron oxide black to an aniline black mixture was 1:1), ordinary Portland cement, blast furnace slag powder, silica fume, lightweight coarse aggregate, lightweight fine aggregate, water and polycarboxylate superplasticizer powder were 2.35%, 1.2%, 1.47%, 17.62%, 0.84%, 5.89%, 33.57%, 24.48%, 12.59% and 0.03% in a sequence.

Example 23: The mix ratio by weight of zinc sulfate, a modified dark pigment (the mass ratio of iron oxide black to an aniline black mixture was 1:1), modified biological calcium powder (the mass ratio of modified bovine bone powder to oyster shell powder was 2:1), calcium carbonate powder, ordinary Portland cement, silica fume, blast furnace slag powder, crushed stone, sand, water and polycarboxylate superplasticizer powder were 0.5%, 1.47%, 1.47%, 0.87%, 17.62%, 0.93%, 6.50%, 33.57%, 24.48%, 12.59% and 0.03% in a sequence.

Example 24: The mix ratio by weight of zinc sulfate, a modified dark pigment (the mass ratio of iron oxide black to an aniline black mixture was 1:1), modified biological calcium powder (the mass ratio of modified bovine bone powder to oyster shell powder was 2:1), calcium carbonate powder, ordinary Portland cement, silica fume, blast furnace slag powder, crushed stone, sand, water and polycarboxylate superplasticizer powder were 0.6%, 1.47%, 1.47%, 0.87%, 17.62%, 0.84%, 5.89%, 33.57%, 24.48%, 12.59% and 0.03% in a sequence.

A modification method of zinc sulfate comprises the following steps: selecting diatomite with $SiO_2$ content of more than 90% and fineness of 600 meshes, adding 150 g of water into a stirrer at 60° C., then adding 100 g of zinc sulfate, stirring until the zinc sulfate was completely dissolved, and standing for later use; and then heating 150 g of diatomite to 60° C., adding the diatomite into the solution, stirring for 10 min in a stirrer at a rotating speed of 200-500 rpm, and then drying in a drying oven with a temperature of 100° C., thus obtaining the modified zinc sulfate.

Example 25: The mix ratio by weight of zinc sulfate, a modified dark pigment (the mass ratio of iron oxide black to an aniline black mixture was 1:1), modified biological calcium powder (the mass ratio of modified bovine bone powder to oyster shell powder was 2:1), calcium carbonate powder, ordinary Portland cement, silica fume, blast furnace slag powder, crushed stone, sand, water, chopped fibers and polycarboxylate superplasticizer powder were 0.5%, 1.47%, 1.47%, 0.87%, 17.62%, 0.93%, 6.50%, 33.07%, 24.18%, 12.59%, 0.8% and 0.03% in a sequence.

Example 26: The mix ratio by weight of the cementitious material, sand, water, a modified dark pigment (the mass ratio of iron oxide black to an aniline black mixture was 1:1), modified biological calcium powder (the mass ratio of modified bovine bone powder to oyster shell powder was 2:1), calcium carbonate powder, zinc sulfate, lignocellulose, dispersible adhesive powder, and the superplasticizer was 1:0.5:0.4:0.03:0.03:0.03:0.02:0.06:0.06:0.005.

Example 27: The mix ratio by weight of the cementitious material, sand, water, a modified dark pigment (the mass ratio of iron oxide black to an aniline black mixture was 1:1), modified biological calcium powder (the mass ratio of modified bovine bone powder to oyster shell powder was 2:1), calcium carbonate powder, zinc sulfate, lignocellulose, dispersible adhesive powder, and the superplasticizer was 1:0.5:0.4:0.05:0.05:0.05:0.02:0.06:0.06:0.005.

Example 28: The mix ratio by weight of the cementitious material, sand, water, a modified dark pigment (the mass ratio of iron oxide black to an aniline black mixture was 1:1), modified biological calcium powder (the mass ratio of modified bovine bone powder to oyster shell powder was 2:1), calcium carbonate powder, zinc sulfate, lignocellulose, dispersible adhesive powder, and the superplasticizer was 1:0.5:0.4:0.05:0.05:0.05:0.04:0.08:0.09:0.005.

Example 29: The mix ratio by weight of the cementitious material, sand, water, a modified dark pigment (the mass ratio of iron oxide black to an aniline black mixture was 1:1), modified biological calcium powder (the mass ratio of modified bovine bone powder to oyster shell powder was 2:1), calcium carbonate powder, zinc sulfate, lignocellulose, dispersible adhesive powder, and the superplasticizer was 1:0.5:0.4:0.08:0.08:0.08:0.04:0.08:0.09:0.005.

Example 30: The mix ratio by weight of the cementitious material, sand, water, a modified dark pigment (the mass ratio of iron oxide black to an aniline black mixture was 1:1), modified biological calcium powder (the mass ratio of modified bovine bone powder to oyster shell powder was 2:1), calcium carbonate powder, zinc sulfate, lignocellulose, dispersible adhesive powder, and the superplasticizer was 1:0.5:0.4:0.08:0.08:0.08:0.06:0.10:0.12:0.005.

Example 31: The mix ratio by weight of the cementitious material, sand, water, a modified dark pigment (the mass ratio of iron oxide black to an aniline black mixture was 1:1), modified biological calcium powder (the mass ratio of modified bovine bone powder to oyster shell powder was 2:1), calcium carbonate powder, zinc sulfate, lignocellulose, dispersible adhesive powder, and the superplasticizer was 1:0.5:0.4:0.03:0.03:0.03:0.04:0.06:0.06:0.005.

Example 32: The mix ratio by weight of the cementitious material, sand, water, a modified dark pigment (the mass ratio of iron oxide black to an aniline black mixture was 1:1), modified biological calcium powder (the mass ratio of modified bovine bone powder to oyster shell powder was 2:1), calcium carbonate powder, zinc sulfate, lignocellulose, dispersible adhesive powder, and the superplasticizer was 1:0.5:0.4:0.05:0.05:0.05:0.04:0.06:0.06:0.005.

Example 33: The mix ratio by weight of the cementitious material, sand, water, a modified dark pigment (the mass ratio of iron oxide black to an aniline black mixture was 1:1), modified biological calcium powder (the mass ratio of modified bovine bone powder to oyster shell powder was 2:1), calcium carbonate powder, zinc sulfate, lignocellulose, dispersible adhesive powder, and the superplasticizer was 1:0.5:0.4:0.05:0.05:0.05:0.02:0.08:0.09:0.005.

Example 34: The mix ratio by weight of the cementitious material, sand, water, a modified dark pigment (the mass ratio of iron oxide black to an aniline black mixture was 1:1), modified biological calcium powder (the mass ratio of modified bovine bone powder to oyster shell powder was 2:1), calcium carbonate powder, zinc sulfate, lignocellulose, dispersible adhesive powder, and the superplasticizer was 1:0.5:0.4:0.08:0.08:0.08:0.06:0.08:0.09:0.005.

Example 35: The mix ratio by weight of the cementitious material, sand, water, a modified dark pigment (the mass ratio of iron oxide black to an aniline black mixture was 1:1), modified biological calcium powder (the mass ratio of modified bovine bone powder to oyster shell powder was 2:1), calcium carbonate powder, zinc sulfate, lignocellulose, dispersible adhesive powder, and the superplasticizer was 1:0.5:0.4:0.03:0.03:0.03:0.06:0.10:0.12:0.005.

A dark pigment modification method comprises the following steps: mixing 196 transparent resin, 3% of a hardener and 1.5% of an accelerator, wherein the volume ratio of the pigment to the resin was 1:0.2, curing at a normal temperature for 4 h, curing at 60° C. for 4 h, breaking, and grinding with a vibration mill until the fineness was greater than 400 meshes.

A bovine bone powder modification method comprises the following steps: adding 100-mesh bovine bone powder into a phosphoric acid solution with the concentration of 2%, wherein the weight ratio of the bovine bone powder to the phosphoric acid solution was 1:3, and the temperature was 20-30° C.; stirring in a stirrer at a rotating speed of 200-500 rpm for 30 min, centrifuging for 3 min by adopting a centrifugal machine at a rotating speed of 3,000-5,000 rpm, pouring out the supernatant, and washing the centrifuged solid substance for 2-3 times by using water until washing water did not show acidity anymore; and performing vacuum drying on the centrifuged solid substance at the temperature of 40° C., grinding the dried bovine bone powder and slag powder in a mass ratio of 1:4 by using a vibration mill until the fineness was more than 200 meshes, and standing for later use.

A modification method of zinc sulfate comprises the following steps: selecting diatomite with $SiO_2$ content of more than 90% and fineness of 600 meshes, adding 150 g of water into a stirrer at 60° C., then adding 100 g of zinc sulfate, stirring until the zinc sulfate was completely dissolved, and standing for later use; and then heating 150 g of diatomite to 60° C., adding the diatomite into the solution, stirring for 10 min in a stirrer at a rotating speed of 200-500 rpm, and then drying in a drying oven with a temperature of 100° C., thus obtaining the modified zinc sulfate.

In "Living Breakwaters Coastal Infrastructure in New York" by Sun Yihe (hereafter, "comparison document 1"), the "living" breakwaters were constructed, concrete members were manufactured by macroscopic design and surface texture through low-alkali cement, the marine biomass was increased, including marine plants and marine sessile organisms, mostly marine plants. In the present disclosure, besides low alkalization of the concrete, dark pigments, biological calcium powder, calcium carbonate powder and trace elements were added into concrete to induce oyster larvae, and the induction was quickly performed in a compact manner, the effect was good, and the ecological environment of the sea area was improved to a great extent.

Compared with "A bionic concrete artificial fish reef and a preparation method thereof" or 2015 CN104938384 A (hereafter, "comparison document 2"), the difference was that:

(1) The objective of the present disclosure was different from that of the comparison document 2 in that: in the comparison document 2, although a layer of cement mortar mixed with ground oyster shells was applied to the concrete surface, the objective of the comparison document 2 was mainly achieved through the surface bionic property, including fish, microorganisms and algae, the number of the microorganisms was increased, and thus the water environment was improved; and oysters were not mentioned. The objective of the present disclosure of cement-based coating was to induce the settlement of the oyster larvae.

(2) The comparison document 2 indicated that the cement replaced by the biological calcium carbonate powder (150-200 meshes) below 10% for cement mortar had no obvious effect on settlement induction. However, the modified bovine bone powder and biological calcium carbonate powder (with the fineness being 100-1,000 meshes) were adopted in the research process of the present disclosure, and the optimal dosage of the bovine bone powder and the biological calcium carbonate powder accounted for less than 10% of the cementitious material.

(3) The bovine bone powder and the biological calcium carbonate powder were modified and were specifically modified by treating the 100-500-mesh egg shell powder, coral powder, oyster shell powder and fishbone powder with one or two of acetic acid, acetic acid aqueous solution, silicic acid and sulfurous acid, and treating the 100-500-mesh bovine bone powder with one or two of diluted phosphoric acid, sulfuric acid, hydrochloric acid and nitric acid.

(4) Comparison document had difficulty in inlaying oyster shells on the concrete surface, the method was not adopted on each engineering surface, and the feasibility was low. The present disclosure could achieve a good effect of inducing sessile organisms by painting a layer of cement-based coating on the concrete surface, oyster shells were not inlaid, the construction was simple, and the settlement amount of the oyster could be greatly increased; and (5) The phenomenon of serious artificial fish reef corrosion occurred in the marine environment for many times in recent years, and serious corrosion was mainly caused by the combined action of biological sulfuric acid secreted by anaerobic microorganism *Thiobacillus* and acidic substances secreted by other bacteria. The acid corrosion resistance of calcium carbonate was very weak, so that serious acid corrosion could be caused by too high content of calcium carbonate with relatively high fineness.

Compared with "Effect of the Substrate Types on Oyster Settlement, Growth, Population Establishment and Reef Development" by Fan Ruiliang (hereafter, "comparison document 3"), the difference was that:

(1) In the comparison document 3, 80-mesh bovine bone powder, calcium powder and gypsum powder were used and independently added into the concrete. The fineness of all calcium materials in the present disclosure was larger than 100 meshes and was larger than that of the materials in the comparison document 3. The bovine bone powder was also added and modified, and the coating and the concrete grain gradation and the induction capacity were considered.

Figure 2:
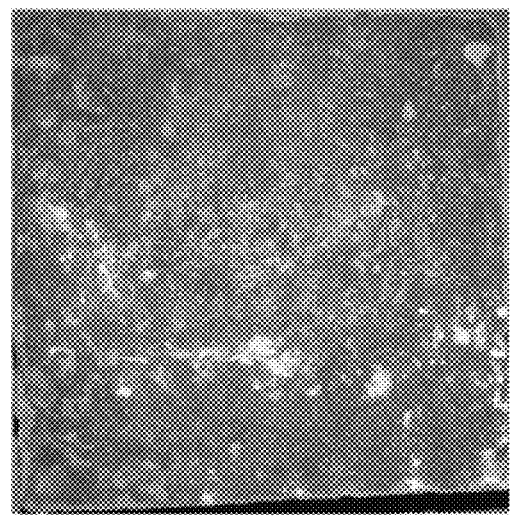
FIG. 2 shows different concrete mix adding 10% modified bovine bone powder with a fineness larger than 200 meshes.

(2) The bovine bone powder was ground by using a vibration mill under normal temperature conditions, when the fineness was greater than 80 meshes, the bovine bone powder contained lots of collagen and was severely agglomerated and could not be continuously ground. The diluted acid modification technology was adopted in the present disclosure, and the bovine bone powder was compounded with other substances and ground, so that the bovine bone powder with small particle size and modified biological calcium powder with the fineness of more than 200 meshes were obtained. The prepared biological calcium powder remained the original substances of biological calcium, greatly increased the release rate of the substances inducing oyster larvae to settle, and reduced the dosage of the biological calcium powder, thereby reducing the effect on the coating and the concrete performance. And (3) Due to the fact that bovine bone powder contained rich organic substances such as collagen, the strength and the penetration resistance of coating and concrete could be reduced when a large amount of the substances were added, especially after the dosage exceeded 5%, the strength of the coating and the concrete was rapidly reduced, the penetration resistance was remarkably reduced, and mildew could grow on the surface of the coating and the concrete under the standard curing condition. FIG. 1 showed the mildewing condition of the concrete specimens. FIG. 2 showed the surface condition of the modified concrete.

As shown in FIG. 1, mildew on the surface of concrete was white flocculent and almost covered the whole surface of the concrete; under the same bovine bone powder dosage, age and curing conditions, the surface of the concrete in FIG. 2 was not mildewed.

In the present disclosure, a diluted acid modification technology and a composite grinding technology are adopted in a control way, the induction capability of the bovine bone powder is fully exerted, the dosage of the bovine bone powder is greatly reduced, and anti-corrosion treatment and modification are carried out, so that a composite inducer taking the bovine bone powder as a main component is realized, the dosage of the composite inducer is small, the strength and permeability of coating and concrete are hardly influenced, meanwhile, the composite inducer has very strong oyster larva settlement capability, and the problem of mildewing of the coating and the concrete is solved. Compared with coating and concrete without the inducer, the coating and the concrete with the inducer enables the number of settled oyster larvae to be obviously increased.

The comparison documents and consulted literature data showed that the calcium content was very important for the settlement of the oyster larvae, and some experimental results at present also proved that the settlement and the growth of the oyster larvae could be promoted by adding a proper dosage of calcium carbonate substances into a cement-based material. However, cement coating and cement concrete contained a large number of calcium ions, the pH value in a pore solution was generally greater than 12.5, and the pH value of a saturated calcium hydroxide solution was about 12 at normal temperature, thus the concentration of the calcium ions in the pore solution of the concrete was about 5 mmol/L; and the solubility of calcium carbonate was very small and was only 9.5×10-5 mol/L (9.5×10-2 mmol/L) at 25° C. At present, the optimal range of the concentration of the calcium ions for inducing the settlement of the oysters was 10-25 mmol/L, and even if the oyster larvae were placed in the saturated calcium carbonate solution, the concentration of $Ca^{2+}$ was not enough to provide the appropriate ion concentration for the settlement of the oysters. Further, $Ca(OH)_2$ in the cement coating and the cement concrete could be released more quickly, and the dissolution of the calcium carbonate needed a longer time. Therefore, it could be inferred that the calcium carbonate material added into the coating and the concrete could promote the settlement of the oyster larvae, and the $Ca^{2+}$ did not play a leading role. The early settlement and metamorphosis of the oysters were related to $HCO_3^-$, and the secondary shells of the calcium carbonate were generated by $HCO_3^-$ together with the $Ca^{2+}$ during metamorphosis. After the calcium carbonate was added, the calcium carbonate reacted with $CO_2$ and water to generate $Ca(HCO_3)_2$ to participate in the settlement, which was a fundamental mechanism for promoting the settlement of the oyster larvae.

There was an optimum dosage in the dosage of calcium carbonate in the cement-based material, which could be explained from the following three aspects:

1) For equivalent substituted cement, the alkali in the coating and the concrete was diluted along with the increase of the dosage of the calcium carbonate, and the total alkalinity was reduced; however, along with the increase of the dosage of the calcium carbonate, the dissolution probability of the calcium carbonate in the coating and the concrete was increased, and the content of $HCO_3-$ in the solution was increased, thus the settlement and the metamorphosis of the oysters were promoted; however, when the dosage was too large, the permeability of the coating and the concrete was increased sharply, and the alkali and carbonate radicals in the coating and the concrete were quickly leached, so that the negative effect of the alkali was prominent, and the critical or negative effect of the carbonate radicals was initially prominent, thus the settlement amount was reduced;

2) For equivalent substituted aggregate, the permeability of the coating and the concrete was reduced along with the increase of the dosage, consequently, the leach of calcium ions and OH– was reduced, but the leach rate of carbonate ions was gradually increased first, and when the leach rate reached a certain value, oyster settlement reached a maximum value; and along with the continuous increase of the dosage, the reduction amplitude of the calcium ions was large, and the carbonate radicals were possibly reduced, thus the settlement of the oyster larvae was limited by the concentration of the calcium ions, and the settlement was reduced; and 3) For an equivalent substituted mineral admixture, the permeability was increased along with the increase of the dosage, and the $HCO_3-$ concentration reached a proper range for the oyster settlement due to the increase of calcium carbonate, which indicated the increase of the settled oyster larvae; and along with the continuous increase of the dosage of the calcium carbonate, the dosage of the mineral admixture was reduced, so the amount of leaching alkali was increased, the carbonate radicals were increased, and the settlement of the oyster larvae was inhibited by excessive alkali and $HCO_3-$ ions.

Compared with "Study on the Organisms Attachment of Artificial Reefs Constructed with Five Different Cements" by Li Zhenzhen, Gong Pihai, Guan Changtao, et al, Progress in Fishery Sciences, 2017, 38(5):57-63 (hereafter, "comparison document 4"), the difference was that:

In the comparison document 4, composite Portland cement, slag Portland cement, pozzolanic Portland cement, fly ash Portland cement and aluminate cement were used. In the present disclosure, low-alkalinity cement was achieved by ordinary Portland cement adding mineral admixtures; silica fume was one of the mineral admixtures and had high activity, and optimum dosage of silica fume could achieve obvious effect on increasing the durability of reinforced concrete in the marine environment. Low-alkalinity cement with the excellent strength and durability could be obtained through optimization design and experiments. Meanwhile, by means of the high penetration resistance characteristic of the silica fume concrete, even if the alkalinity in the concrete was high, a large number of oyster larvae still adhered to, metamorphosized and grew on the concrete surface. The low-alkalinity sulphoaluminate cement was compounded to regulate and control the alkalinity of the cement concrete, and thus an appropriate pH value was provided for oyster larva settlement. In addition, compared to marine plants, oysters, barnacles and other sessile organisms were different in alkali resistance, the environments needed in the settlement period and later period were different, for example, a large number of calcium ions were needed for settlement, metamorphosis and later-period growth of the barnacles and the oysters.

Figure 3:
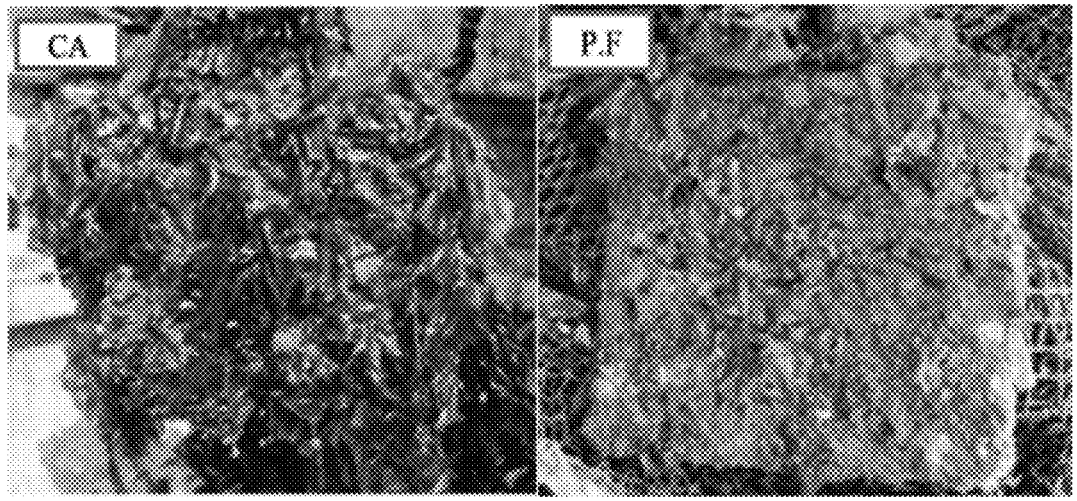
FIG. 3 is a picture of 210*d* of a settlement experiment in sea.
Figure 4:
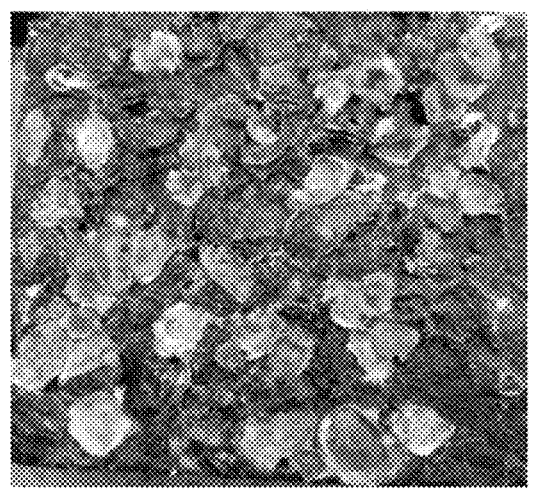
FIG. 4 is a picture of 300*d* of a settlement experiment in seat.

In the comparison document 4, the concrete was used for enriching marine organisms, focusing on the amount and diversity of attached biomass, and the mainly attached organisms were various algae and the like. The research objective of the present disclosure was to induce the settlement of the oysters, but the alkalinity tolerance of oysters and barnacles was higher than that of algae, and a large amount of calcium ions were needed for settlement and metamorphosis of the oysters, so that the two kinds of concrete looked like the same, but in fact there was a big difference. FIG. 3 and FIG. 4 respectively showed the oyster settlement comparison conditions between the comparison document 4 after performing the real sea settlement experiment for about 210 d and the present disclosure after performing the real sea settlement experiment for 300 d.

Therefore, the above knowledge related to crossing of the marine sessile organism discipline, marine plants and marine concrete engineering disciplines, and technicians in the fields of concrete and engineering or the field of marine organisms could not obtain the technical characteristics of close correlation between the balance between the reduction of the alkalinity of the concrete and the concentration of calcium ions and the settlement of the marine sessile organisms from the comparison document 4.

In addition, the present disclosure has the unique characteristics and the following beneficial effects:

Dark Pigment

The light-shielding characteristic of oyster eyespot larvae was utilized, the dark pigment (one or two of iron oxide black, nigrosine, carbon black, antimony sulfide, iron oxide red and organic pigment red) were doped into the coating and the concrete, the color of the coating and the concrete were changed and darkened, the coating and the concrete were regarded as a dark environment by the oyster larvae, thus the oyster larvae were induced to reach the dark coating surface and concrete surface, the contact probability of the larvae and the coating surface and the concrete surface were increased, and the induced settlement rate of the oyster larvae was increased. Specifically: Marine organism researchers carried out the research on the settlement of marine sessile organisms by substrates with different colors in order to cultivation and propagation or eliminate unexpected populations, which belonged to the marine organism discipline. The marine organism discipline was quite different from the marine concrete engineering or cement-based material discipline, they were completely two major disciplines. Through the crossing of the marine sessile organism discipline and the cement-based material discipline, the induced settlement of the oyster larvae by dark coating and dark concrete was realized. In the present disclosure, the dark pigment was added to deepen the surface color of coating and concrete so as to promote the settlement of the oyster larvae. Other materials were added in the coating and the concrete, which could affect the properties of the coating and the concrete. In the present disclosure, in consideration of the concrete of different cements, there was a difference in surface color of the coating and the concrete. Therefore, the dosage of the dark substances could be determined according to the type and dosage of the cement. The dark pigment also affected the properties of the coating and the concrete. Most importantly, when the dark pigment was added, if the penetration rates of alkali, $Ca^{2+}$ and the like in the coating and the concrete were not controlled, the leached alkali could affect the settlement, metamorphosis and growth of the sessile organism larvae, and when the dosage was greater than a certain value, the settlement amount of the larvae was reduced. In the present disclosure, the penetration resistance of the coating and the concrete was designed and controlled, and the main measures were as follows: selection of the type of the dark pigment, control of the dosage and modification. With the increase of the dosage of the dark pigment, the settlement rate of the larvae was increased first, and when the dosage accounted of 0.5%-6% of the cementitious material, the settlement amount of the larvae was maximum, but was slightly increased or kept unchanged later.

Trace Elements

A large amount of zinc was enriched in the oyster body, and zinc concentration was far higher than that in the seawater in which the oyster lives, and meanwhile, the oyster body further contains more Fe, P and K elements. Meanwhile, proper concentration of $Zn^{2+}$ and $K^+$ in the solution could promote early settlement and metamorphosis of the oyster larvae. Therefore, zinc sulfate, potassium sulfate, potassium nitrate, ferric sulfate, zinc phosphate, ammonium nitrate, potassium phosphate, ammonium phosphate, ferric phosphate and calcium phosphate were adopted as the trace elements to be doped into the coating and the concrete, and these substances were modified to enable the strength and the penetration resistance of the coating and the concrete to be basically kept unchanged, and thus the induced settlement rate of the oyster larvae was greatly increased. Specifically:

Marine organism researchers carried out the research on the settlement and metamorphosis of different ions to marine sessile organisms in order to clarify oyster settlement mechanisms and cultivation propagation, which belonged to the marine organism discipline. The marine organism discipline was quite different from the marine concrete engineering or cement-based material discipline, they were completely two major disciplines. Through the crossing of the marine sessile organism discipline and the cement-based material discipline, corresponding substances were added into the concrete to induce the oyster larvae to settle on the surface of the coating and the concrete. Soluble salts had great influence on the properties of the coating and the concrete, such as influence on early workability, setting time and later strength and penetration resistance. Diatomite was adopted as a carrier in the present disclosure, the inorganic salts were fixed in the diatomite, and thus the influence of the soluble salts on the properties of the coating and the concrete was reduced. Meanwhile, the effect of improving the properties of the coating and the concrete by the diatomite was utilized to keep good mechanical property and penetration resistance of the coating and the concrete when these inducing substances were added. In addition, diatomite serving as the carrier had a slow release effect, thus soluble salt was released slowly, and particularly, the release was kept at a very low rate after the diatomite was soaked in seawater for a certain period of time. Therefore, the above knowledge related to crossing of the marine sessile organism discipline, chemistry and marine concrete engineering disciplines, and technicians in the fields of concrete and engineering or the field of marine organisms could not obtain the technical characteristics of close correlation between the technology of doping the trace elements into the coating and the concrete to change the ion content of the trace elements on the surface of the coating and the concrete and control the permeability of the cement-based material and the cement-based material with the capability of efficiently inducing the settlement of the oysters through the existing background.

Coating and Concrete Permeability

The strength and permeability of concrete were two main properties of the coating and the concrete. Different inducers added into reference coating and reference concrete could influence the properties of the coating and the concrete. Therefore, when different substances were added to promote settlement, metamorphosis and later growth of the oyster larvae, it must be integrally controlled to make sure that the different substances did not have a big impact on the strength and permeability of the coating and the concrete, and then raw materials were selected according to the compatibility of various raw materials. If the properties of the raw materials could not meet the actual requirements, the raw materials were modified and then added so as to achieve the expected functions. In practice, although related research was performed by considering the influence of the dosage of calcium on oyster larva settlement, the properties of coating and concrete, the water-cement ratio, the dosage of calcium, maintenance and the like were not considered, moreover, the leakage rate of alkali and ions in the coating and the concrete could be changed due to the change of the permeability of the coating and the concrete, the poorer the penetration resistance of the coating and the concrete was, the higher the leakage rate of the alkali and the ions in the coating and the concrete was, and the leakage rate might be exponentially increased. Therefore, the leached alkali and ions could greatly influence the larvae, a change from promoting settlement to inhibiting settlement might occur, and particularly when the content of cement was large, the situation was more serious. Therefore, when the inducer was added into the coating and the concrete, it must be guaranteed that the change of the penetration resistance of the coating and the concrete was within a controllable range, for example, the change could not exceed 10%. In this way, the induction effects could be compared, otherwise, the influence of single inducer addition or inducer composite addition on the induction effect of the oyster larvae could not be evaluated.

Only the optimum environment required by settlement, metamorphosis and later growth of marine sessile organisms was mastered, and coating and concrete could be designed from the penetration resistance level of the coating and the concrete instead of only considering the dosage of various raw materials and ignoring the penetration resistance change of the coating and the concrete. Therefore, the above knowledge related to crossing of the marine sessile organism discipline, chemistry and marine concrete engineering disciplines, and technicians in the fields of concrete and engineering or the field of marine organisms could not obtain the technical characteristics of close correlation between the integral control technology of the penetration resistance of the coating and the concrete and the technology of promoting the capability of inducing the settlement of the oysters by the inducer through the existing background.

Therefore, the above knowledge related to crossing of the marine sessile organism discipline, marine plants and marine concrete engineering disciplines, and technicians in the fields of concrete and engineering or the field of marine organisms could not obtain the technical characteristics of close correlation between the technology of mixing the dark pigment into the concrete to change the color, the technology of modifying the bovine bone powder, the technology of grinding and the technology of controlling the permeability of the cement-based material and the cement-based material with the capability of efficiently inducing the settlement of the oysters and high durability concrete from the comparison documents 2-3. The technicians also cloud not obtain the technical characteristics of close correlation between the balance between the reduction of the alkalinity of the cement-based material and the concentration of calcium ions and the settlement of the marine sessile organisms from the comparison document 4.

The present disclosure would be described in detail below through Examples A1-10. The specific implementation methods of the Examples A1-10 were the same as the implementation methods of the aforementioned cement-based coating for inducing the settlement of marine sessile organisms for marine engineering surface (26-35).

Compared with a comparison document 2 (a bionic concrete artificial fish reef and a preparation method thereof 2015 CN104938384 A), the difference was that:
(1) The objective of the present disclosure was different from that of the comparison document 2 in that: in the comparison document 2, although a layer of cement mortar mixed with ground oyster shells was applied to the concrete surface, the objective of the comparison document 2 was mainly achieved through the surface bionic property, including fish, microorganisms and algae, the number of the microorganisms was increased, and thus the water environment was improved; and oysters were not mentioned. The objective of the present disclosure of cement-based coating was to induce the settlement of the oyster larvae, mainly oysters; the settlement of barnacles could be considered when performing corrosion prevention on reinforced concrete in the tidal zone.
(2) The comparison document 2 indicated that the cement replaced by the biological calcium carbonate powder (150-200 meshes) below 10% for cement mortar had no obvious effect on settlement induction. However, the modified bovine bone powder and biological calcium carbonate powder (with the fineness being 100-1,000 meshes) were adopted in the research process of the present disclosure, and the optimal dosage of the bovine bone powder and the biological calcium carbonate powder accounted for less than 10% of the cementitious material.
(3) The bovine bone powder and the biological calcium carbonate powder were modified and were specifically modified by treating the 100-500-mesh egg shell powder, coral powder, oyster shell powder and fishbone powder with one or two of acetic acid, acetic acid aqueous solution, silicic acid and sulfurous acid, and treating the 100-500-mesh bovine bone powder with one or two of diluted phosphoric acid, sulfuric acid, hydrochloric acid and nitric acid.
(4) Comparison document had difficulty in inlaying oyster shells on the concrete surface, the method was not adopted on each engineering surface, and the feasibility was low. The present disclosure could achieve a good effect of inducing sessile organisms by painting a layer of cement-based coating on the concrete surface, and oyster shells were not inlaid; the construction was simple, and the settlement amount of the oyster could be greatly increased. And
(5) The phenomenon of serious artificial fish reef corrosion occurred in the marine environment for many times in recent years, and serious corrosion was mainly caused by the combined action of biological sulfuric acid secreted by anaerobic microorganism *Thiobacillus* and acidic substances secreted by other bacteria. The acid corrosion resistance of calcium carbonate was very weak, so that serious acid corrosion could be caused by too high content of calcium carbonate with relatively high fineness.

Compared with a comparison document 3 (Fan Ruiliang. Effect of the Substrate Types on Oyster Settlement, Growth, Population Establishment and Reef Development [D]), the difference was that:
(1) In the comparison document 3, 80-mesh bovine bone powder, calcium powder and gypsum powder were used and independently added into the concrete. The fineness of all calcium materials in the present disclosure was larger than 100 meshes and was larger than that of the materials in the comparison document 3. The bovine bone powder was also added and modified, and the coating grain gradation and the induction capacity were considered.
(2) The bovine bone powder was ground by using a vibration mill under normal temperature conditions, when the fineness was greater than 80 meshes, the bovine bone powder contained lots of collagen and was severely agglomerated and could not be continuously ground. The diluted acid modification technology was adopted in the present disclosure, and the bovine bone powder was compounded with other substances and ground, so that the bovine bone powder with small particle size and modified biological calcium powder with the fineness of more than 200 meshes were obtained. The prepared biological calcium powder remained the original substances of biological calcium, greatly increased the release rate of the substances inducing oyster larvae to settle, and reduced the dosage of the biological calcium powder, thereby reducing the effect on the coating performance.
(3) Due to the fact that bovine bone powder contained rich organic substances such as collagen, the strength and the penetration resistance of coating could be reduced when a large amount of the substances was added, especially after the dosage exceeded 5%, the strength of the coating was rapidly reduced, the penetration resistance was remarkably reduced, and mildew could grow on the surface of the coating under the standard curing condition.

In the present disclosure, a diluted acid modification technology and a composite grinding technology are adopted in a control way, the induction capability of the bovine bone powder is fully exerted, the dosage of the bovine bone powder is greatly reduced, and anti-corrosion treatment and modification are carried out, so that a composite inducer taking the bovine bone powder as a main component is realized, the dosage of the composite inducer is small, the strength and permeability of coating are hardly influenced, meanwhile, the composite inducer has very strong oyster larva settlement capability, and the problem of mildewing of the coating is solved. Compared with coating without the inducer, the coating with the inducer enables the number of settled oyster larvae to be obviously increased.

The comparison documents and consulted literature data showed that the calcium content was very important for the settlement of the oyster larvae, and some experimental results at present also proved that the settlement and the growth of the oyster larvae could be promoted by adding a proper dosage of calcium carbonate substances into a cement-based material. However, cement-based coating contained a large number of calcium ions, the pH value in a pore solution was generally greater than 12.5, and the pH value of a saturated calcium hydroxide solution was about 12 at normal temperature, thus the concentration of the calcium ions in the pore solution of the cement-based coating was about 5 mmol/L; and the solubility of calcium carbonate was very small and was only 9.5×10-5 mol/L (9.5×10-2 mmol/L) at 25° C. At present, the optimal range of the concentration of the calcium ions for inducing the settlement of the oysters was 10-25 mmol/L, and even if the oyster larvae were placed in the saturated calcium carbonate solution, the concentration of $Ca^{2+}$ was not enough to provide the appropriate ion concentration for the settlement of the oysters. Further, $Ca(OH)_2$ in the coating could be released more quickly, and the dissolution of the calcium carbonate needed a longer time. Therefore, it could be inferred that the calcium carbonate material added into the coating could promote the settlement of the oyster larvae, and the $Ca^{2+}$ did not play a leading role. The early settlement and metamorphosis of the oysters were related to $HCO3-$, and the secondary shells of the calcium carbonate were generated by $HCO3-$ together with the $Ca^{2+}$ during metamorphosis. After the calcium carbonate was added, the calcium carbonate reacted with $CO_2$ and water to generate $Ca(HCO_3)_2$ to participate in the settlement, which was a fundamental mechanism for promoting the settlement of the oyster larvae.

There was an optimum dosage in the dosage of calcium carbonate in the cement-based material, which could be explained from the following three aspects:
1) For equivalent substituted cement, the alkali in the cement-based material was diluted along with the increase of the dosage of the calcium carbonate, and the total alkalinity was reduced; however, along with the increase of the dosage of the calcium carbonate, the dissolution probability of the calcium carbonate in the cement-based material was increased, and the content of $HCO_3-$ in the solution was increased, thus the settlement and the metamorphosis of the oysters were promoted; however, when the dosage was too large, the permeability of the cement-based material was increased sharply, and the alkali and carbonate radicals in the cement-based material were quickly leached, so that the negative effect of the alkali was prominent, and the critical or negative effect of the carbonate radicals was initially prominent, thus the settlement amount was reduced;

2) For equivalent substituted aggregate, the permeability of the cement-based material was reduced along with the increase of the dosage, consequently, the leach of calcium ions and $OH^-$ was reduced, but the leach rate of carbonate ions was gradually increased first, and when the leach rate reached a certain value, oyster settlement reached a maximum value; and along with the continuous increase of the dosage, the reduction amplitude of the calcium ions was large, and the carbonate radicals were possibly reduced, thus the settlement of the oyster larvae was limited by the concentration of the calcium ions, and the settlement was reduced; and 3) For an equivalent substituted mineral admixture, the permeability was increased along with the increase of the dosage, and the $HCO_3-$ concentration reached a proper range for the oyster settlement due to the increase of calcium carbonate, which indicated the increase of the settled oyster larvae; and along with the continuous increase of the dosage of the calcium carbonate, the dosage of the mineral admixture was reduced, so the amount of leaching alkali was increased, the carbonate radicals were increased, and the settlement of the oyster larvae was inhibited by excessive alkali and $HCO_3-$ ions.

Compared with a comparison document 4 (Li Zhenzhen, Gong Pihai, Guan Changtao, et al, Study on the Organisms Attachment of Artificial Reefs Constructed with Five Different Cements [J]. Progress in Fishery Sciences, 2017, 38(5):57-63], the difference was that:

In the comparison document 4, composite Portland cement, slag Portland cement, pozzolanic Portland cement, fly ash Portland cement and aluminate cement were used. In the present disclosure, low-alkalinity cement was achieved by ordinary Portland cement adding mineral admixtures; silica fume was one of the mineral admixtures and had high activity, and optimum dosage of silica fume could achieve obvious effect on increasing the durability of reinforced concrete in the marine environment. Low-alkalinity cement with the excellent strength and durability could be obtained through optimization design and experiments. Meanwhile, by means of the high penetration resistance characteristic of the silica fume concrete, even if the alkalinity in the coating was high, a large number of oyster larvae still adhered to, metamorphosized and grew on the coating surface. The low-alkalinity sulphoaluminate cement was compounded to regulate and control the alkalinity of the cement-based coating, and thus an appropriate pH value was provided for oyster larva settlement. In addition, compared to marine plants, oysters, barnacles and other sessile organisms were different in alkali resistance, the environments needed in the settlement period and later period were different, for example, a large number of calcium ions were needed for settlement, metamorphosis and later-period growth of the barnacles and the oysters.

In the comparison document 4, the concrete was used for enriching marine organisms, focusing on the amount and diversity of attached biomass, and the mainly attached organisms were various algae and the like. The research objective of the present disclosure was to induce the settlement of the oysters, but the alkalinity tolerance of oysters and barnacles was higher than that of algae, and a large amount of calcium ions were needed for settlement and metamorphosis of the oysters, so that the two kinds of cement-based material looked like the same, but in fact there was a big difference.

In addition, the present disclosure has the unique characteristics and the following beneficial effects:

Dark Pigment

The light-shielding characteristic of oyster eyespot larvae was utilized, the dark pigment (one or two of iron oxide black, nigrosine, carbon black, antimony sulfide, iron oxide red and organic pigment red) were doped into the coating, the color of the coating was changed and darkened, the coating was regarded as a dark environment by the oyster larvae, thus the oyster larvae were induced to reach the dark concrete surface, the contact probability of the larvae and the concrete surface were increased, and the induced settlement rate of the oyster larvae was increased. Specifically: Marine organism researchers carried out the research on the settlement of marine sessile organisms by substrates with different colors in order to cultivation and propagation or eliminate unexpected populations, which belonged to the marine organism discipline. The marine organism discipline was quite different from the marine concrete engineering or cement-based material discipline, they were completely two major disciplines. Through the crossing of the marine sessile organism discipline and the cement-based material discipline, the induced settlement of the oyster larvae by dark coating was realized. In the present disclosure, the dark pigment was added to deepen the surface color of coating so as to promote the settlement of the oyster larvae. Other materials were added in the coating, which could affect the properties of the coating. In the present disclosure, in consideration of the coating of different cements, there was a difference in surface color of the coating. Therefore, the dosage of the dark substances could be determined according to the type and dosage of the cement. The dark pigment also affected the properties of the coating. Most importantly, when the dark pigment was added, if the penetration rates of alkali, $Ca^{2+}$ and the like in the coating were not controlled, the leached alkali could affect the settlement, metamorphosis and growth of the sessile organism larvae, and when the dosage was greater than a certain value, the settlement amount of the larvae was reduced. In the present disclosure, the penetration resistance of the cement-based material was designed and controlled, and the main measures were as follows: selection of the type of the dark pigment, control of the dosage and modification. With the increase of the dosage of the dark pigment, the settlement rate of the larvae was increased first, and when the dosage accounted of 0.5%-6% of the cementitious material, the settlement amount of the larvae was maximum, but was slightly increased or kept unchanged later.

Trace Elements

A large amount of zinc was enriched in the oyster body, and zinc concentration was far higher than that in the seawater in which the oyster lives, and meanwhile, the oyster body further contains more Fe, P and K elements.

Meanwhile, proper concentration of $Zn^{2+}$ and $K^+$ in the solution could promote early settlement and metamorphosis of the oyster larvae. Therefore, zinc sulfate, potassium sulfate, potassium nitrate, ferric sulfate, zinc phosphate, ammonium nitrate, potassium phosphate, ammonium phosphate, ferric phosphate and calcium phosphate were adopted as the trace elements to be doped into the coating, and these substances were modified to enable the strength and the penetration resistance of the coating to be basically kept unchanged, and thus the induced settlement rate of the oyster larvae was greatly increased. Specifically: Marine organism researchers carried out the research on the settlement and metamorphosis of different ions to marine sessile organisms in order to clarify oyster settlement mechanisms and cultivation propagation, which belonged to the marine organism discipline. The marine organism discipline was quite different from the marine concrete engineering or cement-based material discipline, they were completely two major disciplines. Through the crossing of the marine sessile organism discipline and the cement-based material discipline, corresponding substances were added into the coating to induce the oyster larvae to settle on the surface of the concrete. Soluble salts had great influence on the properties of the coating, such as influence on early workability, setting time and later strength and penetration resistance. Diatomite was adopted as a carrier in the present disclosure, the inorganic salts were fixed in the diatomite, thus the influence of the soluble salts on the properties of the coating was reduced. Meanwhile, the effect of improving the properties of the cement-based coating by the diatomite was utilized to keep good mechanical property and penetration resistance of the cement-based coating when these inducing substances were added. In addition, diatomite serving as the carrier had a slow release effect, thus soluble salt was released slowly, and particularly, the release was kept at a very low rate after the diatomite was soaked in seawater for a certain period of time. Therefore, the above knowledge related to crossing of the marine sessile organism discipline, chemistry and marine concrete engineering disciplines, and technicians in the fields of cement-based material and engineering or the field of marine organisms could not obtain the technical characteristics of close correlation between the technology of doping the trace elements into the coating to change the ion content of the trace elements on the surface of the coating and control the permeability of the coating and the concrete with the capability of efficiently inducing the settlement of the oysters through the existing background.

Coating Permeability

The strength and permeability of coating is crucial. Different inducers added into cement-based coating could influence the properties of the coating. Therefore, when different substances were added to promote settlement, metamorphosis and later growth of the oyster larvae, it must be integrally controlled to make sure that the different substances did not have a big impact on the strength and permeability of the coating, and then raw materials were selected according to the compatibility of various raw materials. If the properties of the raw materials could not meet the actual requirements, the raw materials were modified and then added so as to achieve the expected functions. In practice, although related research was performed by considering the influence of the dosage of calcium on oyster larva settlement, the properties of coating, the water-cement ratio, the dosage of calcium, maintenance and the like were not considered, moreover, the leakage rate of alkali and ions in the coating could be changed due to the change of the permeability of the coating, the poorer the penetration resistance of the coating was, the higher the leakage rate of the alkali and the ions in the coating was, and the leakage rate might be exponentially increased. Therefore, the leached alkali and ions could greatly influence the larvae, a change from promoting settlement to inhibiting settlement might occur, and particularly when the content of cement was large, the situation was more serious. Therefore, when the inducer was added into the coating, it must be guaranteed that the change of the penetration resistance of the coating was within a controllable range, for example, the change could not exceed 10%. In this way, the induction effects could be compared, otherwise, the influence of single inducer addition or inducer composite addition on the induction effect of the oyster larvae could not be evaluated.

Only the optimum environment required by settlement, metamorphosis and later growth of marine sessile organisms was mastered, and coating could be designed from the penetration resistance level of the coating instead of only considering the dosage of various raw materials and ignoring the penetration resistance change of the coating. Therefore, the above knowledge related to crossing of the marine sessile organism discipline, chemistry and marine concrete engineering disciplines, and technicians in the fields of cement-based material and engineering or the field of marine organisms could not obtain the technical characteristics of close correlation between the integral control technology of the penetration resistance of the coating and the technology of promoting the capability of inducing the settlement of the oysters by the inducer through the existing background.

Additionally or Alternatively, the dark pigment is one or two of iron oxide black, nigrosine, carbon black, antimony sulfide, iron oxide red and organic pigment red.

Additionally or Alternatively, the above dark pigments are modified according to the influence degree on the concrete properties; and one of transparent resin, organosilicon, dimethylsiloxane and a super hydrophobic material is used for modification treatment.

Additionally or Alternatively, the biological calcium powder is bovine bone powder, and the biological calcium carbonate powder comprises one or more of oyster shell powder, fishbone powder, egg shell powder and coral powder, with fineness of 100-1,000 meshes.

Additionally or Alternatively, the biological calcium powder is modified by a method for treating the 100-500-mesh egg shell powder, coral powder, oyster shell powder and fishbone powder with one or two of acetic acid, silicic acid and sulfurous acid, and treating the 100-500-mesh bovine bone powder with one or two of diluted phosphoric acid, sulfuric acid, hydrochloric acid and nitric acid;

Additionally or Alternatively, the calcium carbonate powder is one or more of calcite powder, chalk powder, limestone powder, marble powder, aragonite powder, travertine powder, processed lightweight calcium carbonate, active calcium carbonate, calcium carbonate whiskers and ultrafine lightweight calcium carbonate, with fineness of greater than 200 meshes.

Additionally or Alternatively, the trace elements that are zinc, iron, potassium and phosphorus are selected from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate, and are modified to realize slow release of corresponding ions and to reduce or eliminate adverse effects on the concrete properties. However, for eutrophic areas, substances containing nitrogen and phosphorus elements are not selected.

Additionally or Alternatively, the cementitious material is one of mineral admixture added Portland cement, sulphoaluminate cement and an alkali-activated cementitious material. The mineral admixture in the mineral admixture added Portland cement comprises one or a combination of more of silica fume, slag powder and fly ash; the sulphoaluminate cement comprises one or two of rapid hardening sulphoaluminate cement, high-strength sulphoaluminate cement and expansive sulphoaluminate cement; and the alkali-activated cementitious material comprises one of alkali-activated slag powder, and a combination of alkali-activated slag powder and fly ash.

Additionally or Alternatively, the chopped fibers are inorganic fibers (12-20 mm in length) and comprise one or more of basalt fibers, alkali-resistant glass fibers and carbon fibers.

Additionally or Alternatively, the lightweight coarse aggregate is one or two of crushed lightweight porous basalt and lightweight ceramsite of which the maximum particle size is less than 20 mm.

Additionally or Alternatively, and the lightweight fine aggregate is one or two of crushed zeolite and lightweight ceramic sand, with a particle size of 0.2 mm to 5 mm.

A preparation method of a cement concrete settlement substrate with a rough surface for oyster comprise the following steps:

S1, designing different roughness according to the characteristic that oyster larvae prefer to settle on the rough substrate surface, and then manufacturing molding form works with different roughness;

S2, weighing a cementitious material, lightweight coarse aggregate, lightweight fine aggregate, water, a dark pigment, biological calcium powder, calcium carbonate powder, trace elements, chopped fibers and a superplasticizer;

S3, firstly putting the lightweight coarse aggregate and the lightweight fine aggregate into a concrete mixer to be mixed for 0.5-1 min; then adding the cementitious material, the dark pigment, the biological calcium powder, the calcium carbonate powder and the trace elements, and continuously mixing for 1-2 min; then adding the chopped fibers, the water and the superplasticizer, and mixing for 2-6 min; then carrying out casting and consolidating after uniformly mixing; and S4, putting a concrete specimen after demolding into a high-concentration $CO_2$ curing chamber for curing for 0.5-5 h according to the situation so as to reduce the alkalinity of the concrete specimen, and then carrying out standard curing for 28 d or curing according to the actual situation.

Thus, the cement concrete settlement substrate with the rough surface for oyster and a good induction effect can be prepared.

The lightweight concrete settlement substrate with the rough surface for oyster as described in the specific measure in the step (2) comprises the following material components in percentage by weight: 0.6-3.0% of the dark pigment, 21.8-34.5% of the cementitious material, 24.6-37.5% of lightweight coarse aggregate, 15.8-29.6% of lightweight fine aggregate, 8.4-16.4% of water, and 0.03-0.18% of the superplasticizer.

The lightweight concrete settlement substrate with the rough surface for oyster as described in the specific measure in the step (2) comprises the following material components in percentage by weight: 0.4-2.35% of calcium carbonate powder, 21.8-34.5% of the cementitious material, 24.6-37.5% of lightweight coarse aggregate, 15.8-29.6% of lightweight fine aggregate, 8.4-16.4% of water, and 0.03-0.18% of the superplasticizer.

The lightweight concrete settlement substrate with the rough surface for oyster as described in the specific measure in the step (2) comprises the following material components in percentage by weight: 0.4-2.35% of bovine bone powder, 21.8-34.5% of the cementitious material, 24.6-37.5% of lightweight coarse aggregate, 15.8-29.6% of lightweight fine aggregate, 8.4-16.4% of water, and 0.03-0.18% of the superplasticizer.

The lightweight concrete settlement substrate with the rough surface for oyster as described in the specific measure in the step (2) comprises the following material components in percentage by weight: 0.6-3.0% of the modified dark pigment, 0.4-2.35% of calcium carbonate powder, 21.8-34.5% of the cementitious material, 24.6-37.5% of lightweight coarse aggregate, 15.8-29.6% of lightweight fine aggregate, 8.4-16.4% of water, and 0.03-0.18% of the superplasticizer.

Round holes with the diameter of 3-5 mm are reserved in the lightweight concrete settlement substrate with the rough surface for oyster as described in the specific measure in the step (2) during molding.

The concentration period of settlement and metamorphosis of the oyster planktonic larvae in the step (3) is generally May to August in the north and is generally April to October in the south.

The cement-based coating for inducing the settlement of marine sessile organisms for marine engineering surface as described in the specific measure in the step (4): the cement-based coating is prepared in ratio by weight:1 of a cementitious material, 0.35~0.7 of sand, 0.20~0.60 of water, 0.02~0.10 of a dark pigment, 0.02~0.10 of biological calcium powder, 0.02~0.10 of calcium carbonate powder, 0.01~0.08 of trace elements, 0.04~0.12 of lignocellulose, 0.05~0.15 of dispersible adhesive powder, and 0.001~0.010 of a superplasticizer.

Additionally or Alternatively, the dark pigment is one or two of iron oxide black, nigrosine, carbon black, antimony sulfide, iron oxide red and organic pigment red.

Additionally or Alternatively, the above dark pigments are modified according to the influence degree on the concrete properties; and one of transparent resin, organosilicon, dimethylsiloxane and a superhydrophobic material is used for modification treatment.

Additionally or Alternatively, the biological calcium powder is bovine bone powder, and the biological calcium carbonate powder comprises one or more of oyster shell powder, fishbone powder, egg shell powder and coral powder, with fineness of 100-1,000 meshes.

Additionally or Alternatively, the biological calcium powder is obtained by treating the 100-500-mesh egg shell powder, coral powder, oyster shell powder and fishbone powder with one or two of acetic acid, acetic acid aqueous solution, silicic acid and sulfurous acid, and by treating the 100-500-mesh bovine bone powder with one or two of diluted phosphoric acid, sulfuric acid, hydrochloric acid and nitric acid.

Additionally or Alternatively, the calcium carbonate powder is one or more of calcite, chalk, limestone, marble, aragonite, travertine powder, processed lightweight calcium carbonate, active calcium carbonate, calcium carbonate whiskers and ultrafine lightweight calcium carbonate, with fineness of greater than 200 meshes.

Additionally or Alternatively, the trace elements that are zinc, iron, potassium and phosphorus are selected from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate, and are modified to realize slow release of corresponding ions and to reduce or eliminate adverse effects on the concrete properties. However, for eutrophic areas, substances containing nitrogen and phosphorus elements are not selected.

Additionally or Alternatively, the cementitious material is one of mineral admixture added Portland cement, sulphoaluminate cement and an alkali-activated cementitious material. The mineral admixture in the mineral admixture added Portland cement comprises one or a combination of more of silica fume, slag powder and fly ash; the sulphoaluminate cement comprises one or two of rapid hardening sulphoaluminate cement, high-strength sulphoaluminate cement and expansive sulphoaluminate cement; and the alkali-activated cementitious material comprises one of alkali-activated slag powder, and a combination of alkali-activated slag powder and fly ash.

Additionally or Alternatively, sand is one or more of river sand, machine-made sand (basalt or granite as parent rock) or desalinated sea sand, with particle size of 0.16 mm-2.36 mm.

Additionally or Alternatively, superplasticizer is one of polycarboxylate superplasticizer and naphthalene-based superplasticizer.

A cement-based coating for inducing the settlement of marine sessile organisms for marine engineering surface and preparation method, comprises the following steps:

S1, weighing a cementitious material, sand, water, a dark pigment, biological calcium powder, calcium carbonate powder, trace elements, lignocellulose, dispersible adhesive powder and a superplasticizer;

S2, adding the cementitious material, the dark pigment, the biological calcium powder, the calcium carbonate powder and the trace elements into a blender mixer, at rotational speed of 1000-1500 r/min, and continuously mixing for 2-5 min, uniformly mixing;

S3, then adding sand, lignocellulose and dispersible adhesive powder into mixer, at rotational speed of 500-1000 r/min, and mixing for 5-10 min;

S4, adding polycarboxylate superplasticizer powder fully dissolved in water and the material mixed enough into high-speed mixer, at rotational speed of 500-1000 r/min, and mixing for 5-10 min;

Thus, a cement-based coating with good induction effect for inducing the settlement of marine sessile organisms for marine engineering surface can be prepared.

The rope as described in the specific measure in the step (5) is one of a coir rope, a glass fiber rope and a basalt fiber rope.

An objective of the present disclosure is to invent a coating which can be directly brushed and cured in a humid environment. The coating can induce sessile organisms to be quickly and compactly settled on the concrete surface, achieves the effect of biological corrosion prevention by the settlement characteristic of oysters, and further achieves the purposes of purifying water body and restoring ecology by inducing the sessile organisms to settle in a large scale. The present disclosure solves the problems of limited effect of corrosion prevention measures, short service time, high construction cost and the like in a tidal range area and an underwater area of marine concrete engineering, and solves the problem that there is ecological deterioration, and it is urgently needed to perform marine ecological restoration.

The objective of the present disclosure is realized as follows: the low-alkalinity cementitious material, lignocellulose, dispersible rubber powder and the superplasticizer are used, and modified dark pigments, modified biological calcium powder, calcium carbonate powder and trace elements are added into the coating, thus the prepared cement-based coating has high capability of inducing settlement and metamorphosis of oyster larvae and achieves the effect of compact and uniform settlement of oysters; the durability of the concrete structure is improved by the settlement characteristic of the oysters; and no pollution is caused to the marine environment.

The present disclosure further comprises the following structural characteristics:

the cement-based coating is prepared in ratio by weight:1 of a cementitious material, 0.35~0.7 of sand, 0.20~0.60 of water, 0.02~0.10 of a dark pigment, 0.02~0.10 of biological calcium powder, 0.02~0.10 of calcium carbonate powder, 0.01~0.08 of trace elements, 0.04~0.12 of lignocellulose, 0.05~0.15 of dispersible adhesive powder, and 0.001~0.010 of a superplasticizer.

Additionally or Alternatively, the dark pigment is one or two of iron oxide black, nigrosine, carbon black, antimony sulfide, iron oxide red and organic pigment red.

Additionally or Alternatively, the above dark pigments are modified according to the influence degree on the concrete properties; and one of transparent resin, organosilicon, dimethylsiloxane and a superhydrophobic material is used for modification treatment.

Additionally or Alternatively, the biological calcium powder is bovine bone powder, and the biological calcium carbonate powder comprises one or more of oyster shell powder, fishbone powder, egg shell powder and coral powder, with fineness of 100-1,000 meshes.

Additionally or Alternatively, the biological calcium powder is obtained by treating the 100-500-mesh egg shell powder, coral powder, oyster shell powder and fishbone powder with one or two of acetic acid, acetic acid aqueous solution, silicic acid and sulfurous acid, and by treating the 100-500-mesh bovine bone powder with one or two of diluted phosphoric acid, sulfuric acid, hydrochloric acid and nitric acid.

Additionally or Alternatively, the calcium carbonate powder is one or more of calcite, chalk, limestone, marble, aragonite, travertine powder, processed lightweight calcium carbonate, active calcium carbonate, calcium carbonate whiskers and ultrafine lightweight calcium carbonate, with fineness of greater than 200 meshes.

Additionally or Alternatively, the trace elements that are zinc, iron, potassium and phosphorus are selected from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate, and are modified to realize slow release of corresponding ions and to reduce or eliminate adverse effects on the concrete properties. However, for eutrophic areas, substances containing nitrogen and phosphorus elements are not selected.

Additionally or Alternatively, the cementitious material is one of mineral admixture added Portland cement, sulphoaluminate cement and an alkali-activated cementitious material. The mineral admixture in the mineral admixture added Portland cement comprises one or a combination of more of silica fume, slag powder and fly ash; the sulphoaluminate cement comprises one or two of rapid hardening sulphoaluminate cement, high-strength sulphoaluminate cement and expansive sulphoaluminate cement; and the alkali-activated cementitious material comprises one of alkali-activated slag powder, and a combination of alkali-activated slag powder and fly ash.

Additionally or Alternatively, sand is one or more of river sand, machine-made sand (basalt or granite as parent rock) or desalinated sea sand.

Additionally or alternatively, superplasticizer is one of polycarboxylate superplasticizer and naphthalene-based superplasticizer.

A cement-based coating for inducing the settlement of marine sessile organisms for marine engineering surface and preparation method comprises the following steps:
- S1, weighing a cementitious material, sand, water, a dark pigment, biological calcium powder, calcium carbonate powder, trace elements, lignocellulose, dispersible adhesive powder and a superplasticizer;
- S2, adding the cementitious material, the dark pigment, the biological calcium powder, the calcium carbonate powder and the trace elements into a blender mixer, at rotational speed of 1000-1500 r/min, and continuously mixing for 2-5 min, uniformly mixing;
- S3, then adding sand, lignocellulose and dispersible adhesive powder into mixer, at rotational speed of 500-1000 r/min, and mixing for 5-10 min;
- S4, adding polycarboxylate superplasticizer powder fully dissolved in water and the material mixed enough into high-speed mixer, at rotational speed of 500-1000 r/min, and mixing for 5-10 min;

Thus, a cement-based coating with good induction effect for inducing the settlement of marine sessile organisms for marine engineering surface can be prepared.

The present disclosure has the beneficial effects that:

the surfaces of the natural rocks are coated with the cement-based coating for inducing the settlement of sessile organisms for marine engineering surface, and the concrete settlement substrate with the rough surface for oyster is placed on the rock pile, thus oyster larvae can quickly and compactly settle on the rock surface and can absorb sufficient nutrient substances in the settlement, metamorphosis and development processes. By reasonable spatial layout, each rock pile (block) can effectively absorb waves when the current marine load is large, and water bodies on two sides of the breakwater can smoothly exchange at ordinary times. After oysters settled to each rock pile (block) are propagated in quantity, the ecological breakwater can also purify the water bodies and improve the ecological environment of surrounding sea areas. Therefore, the problems that a traditional breakwater blocks the exchange of the water bodies on two sides, changes the pH value of the local sea areas and even damages the ecological environment can be thoroughly solved, and moreover, the ecological environment of the sea areas can be restored by the present disclosure.

At present, there is a lack of a green and economical method for realizing the durability of marine concrete or the ecologicalization of marine concrete engineering. Oysters called marine "ecological engineers" have the functions of compacting the surface of the concrete structure, improving the ecological environment and the like. The cement-based coating for inducing sessile organisms in the present disclosure has the characteristics of quickly inducing the settlement and metamorphosis of the sessile organisms and promoting long-term growth of the sessile organisms, and also has the characteristics of being simple to construct and easy to paint. The cement-based coating can be applied to newly-built marine engineering, especially a large number of on-service marine engineering. The cement-based coating can not only improve the durability of a reinforced concrete structure, but also can simply economically realize the restoration of the marine ecological environment. Therefore, the application of the marine sessile organisms in corrosion prevention of on-service reinforced concrete structure is greatly expanded, and the cement-based coating can also be widely applied to marine ecological environment restoration engineering.

Therefore, the above knowledge related to crossing of the marine sessile organism discipline, marine plants and marine concrete engineering disciplines, and technicians in the fields of cement-based material and engineering or the field of marine organisms could not obtain the technical characteristics of close correlation between the technology of mixing the dark pigment into the coating to change the color, the technology of modifying the bovine bone powder, the technology of grinding and the technology of controlling the permeability of the coating and the coating with the capability of efficiently inducing the settlement of the oysters and high durability coating from the comparison documents 2-3. The technicians also cloud not obtain the technical characteristics of close correlation between the balance between the reduction of the alkalinity of the coating and the concentration of calcium ions and the settlement of the marine sessile organisms from the comparison document 4.

Although examples of the present disclosure have been shown and described, it would be understood by those skilled in the art that various changes, modifications, and substitutions could be made in these embodiments without departing from the principle and spirit of the present disclosure and modifications, the scope of the present disclosure was defined by the appended claims and their equivalents.

The invention claimed is:

1. A construction method for an ecological riprap breakwater, comprising the following steps:
   (1) surveying a sea area of a breakwater construction position, comprises:
      surveying dominant species of oysters in the sea area and whether the oysters are attached, surveying air temperature, seawater temperature, dissolved oxygen, plankton, total dissolved inorganic nitrogen, active phosphate, active silicate, $Ca^{2+}$, $Zn^{2+}$, $K^+$ for the sea area at a plurality of seasons, and
      surveying typhoon times, strength over a plurality of years;
   (2) preparing a concrete settlement substrate, comprises:
      preparing the concrete settlement substrate with a rough surface for the oysters, wherein the concrete settlement substrate for the oysters is one of: a slab-shaped settlement substrate, a wave-shaped settlement substrate, and a cylindrical settlement substrate;
   (3) collecting and cultivating oyster larvae, comprises:
      placing the concrete settlement substrate in a predefined larva collection area of the sea area, wherein the oyster larvae are in metamorphosis period,
      stopping collecting the oyster larvae when the oyster larvae reaches a larval density of 15-25 larvae/100 $cm^2$, and
      moving the concrete settlement substrate to a floating cultivation sea area;
   (4) treating rock surface of rocks, comprises:
      cleaning the rock surface to remove debris and chemical contaminants, spraying or painting a cement-based coating onto the rock surface to induce settlement of marine sessile organisms;

(5) placing the rocks, comprises:
in a concentration period of settlement and metamorphosis of the oyster larvae in the sea area, placing a first plurality of the rocks, each having a volume of mere greater than 1 m³, and covering each rock of the first plurality of the rocks with a first rope;
covering a second plurality of the rocks with a first plurality of ropes to form a plurality of rock piles, each rock of the second plurality of the rocks having a volume less than 1 m³, wherein internal voidage of each rock pile of the plurality of rock piles is 40%~60%; and
connecting the rocks using a second plurality of ropes;

(6) placing the concrete settlement substrate, comprises:
conveying the concrete settlement substrate in which gonad of the oysters develops into mature stage to the sea area,
placing the concrete settlement substrate on a rock of the first plurality of rocks or a rock pile of the plurality of rock piles,
fixing the concrete settlement substrate to the rock of the first plurality of rocks or the rock pile of the plurality of rock piles via a second rope, and,
feeding algae or replenishing nutritive salts if based on planktonic condition of the sea area; and (7) monitoring and managing settlement state of the oyster larval, comprises:
monitoring settlement condition of the oyster larvae;
when larval settlement density of the oyster larval reaches 30 to 40 larvae/100 cm², moving away the concrete settlement substrate.

2. The construction method for the ecological riprap breakwater according to claim 1, wherein the concrete settlement substrate comprises, by weight: 21.8-34.5% of a cementitious material, 24.6-37.5% of lightweight coarse aggregate, 15.8-29.6% of lightweight fine aggregate, 8.4-16.4% of water, 0.6-3.0% of a dark pigment, 0.4-2.0% of biological calcium powder, 0.4-2.0% of calcium carbonate powder, 0.2-1.8% of trace elements, 0.15-1.5% of chopped fibers and 0.03-0.18% of a superplasticizer.

3. The concrete settlement substrate according to claim 2, wherein the dark pigment is selected from one or more of: of iron oxide black, nigrosine, carbon black, antimony sulfide, iron oxide red and organic pigment red;
wherein the biological calcium powder comprises one or more of bovine bone powder and biological calcium carbonate powder, wherein the biological calcium carbonate powder comprises: one or a combination of more of oyster shell powder, fishbone powder, egg shell powder and coral powder, with fineness of 100-1000 meshes;
wherein the calcium carbonate powder comprises one or more of calcite powder, chalk powder, limestone powder, marble powder, aragonite powder, travertine powder, processed lightweight calcium carbonate, active calcium carbonate, calcium carbonate whiskers and ultrafine lightweight calcium carbonate, with a fineness greater than 200 meshes;
wherein the trace elements comprises zinc, iron, potassium and phosphorus derived from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate;
wherein the cementitious material is selected from: Portland cement blended with mineral admixture, sulphoaluminate cement and an alkali-activated cementitious material; the mineral admixture comprises one or more of silica fume, slag powder and fly ash; the sulphoaluminate cement comprises one or more of rapid hardening sulphoaluminate cement, high-strength sulphoaluminate cement and expansive sulphoaluminate cement; and the alkali-activated cementitious material comprises alkali-activated slag powder alone or in combination with fly ash;
wherein the lightweight coarse aggregate is one or more of crushed lightweight porous basalt and lightweight ceramsite, with a maximum particle size less than 20 mm;
wherein the lightweight fine aggregate comprises one or more of crushed zeolite and lightweight ceramic sand, with a particle size between 0.2 mm to 5 mm;
wherein the chopped fibers are inorganic fibers and comprise one or more of basalt fibers, alkali-resistant glass fibers and carbon fibers.

4. The construction method for the ecological riprap breakwater according to claim 1, wherein the cement-based coating comprises, by weight: 1 part of a cementitious material, 0.35~0.7 parts of sand, 0.20~0.60 part of water, 0.02~0.10 part of a dark pigment, 0.02~0.10 parts of biological calcium powder, 0.02~0.10 parts of calcium carbonate powder, 0.01~0.08 parts of trace elements, 0.04~0.12 parts of lignocellulose, 0.05~0.15 parts of dispersible adhesive powder, and parts 0.001~0.010 of a superplasticizer.

5. The construction method for the ecological riprap breakwater according to claim 4, wherein the dark pigment is selected from one or more of: iron oxide black, nigrosine, carbon black, antimony sulfide, iron oxide red and organic pigment red;
wherein the biological calcium powder comprises one or more of bovine bone powder and biological calcium carbonate powder, wherein the biological calcium carbonate powder comprises one or a combination of more of oyster shell powder, fishbone powder, egg shell powder and coral powder, with fineness of 100-1000 meshes;
wherein the calcium carbonate powder is selected from: calcite powder, chalk powder, limestone powder, marble powder, aragonite powder, travertine powder, and one or more of processed lightweight calcium carbonate, active calcium carbonate, calcium carbonate whiskers and ultrafine lightweight calcium carbonate, with a fineness greater than 200 meshes;
wherein the trace elements comprises zinc, iron, potassium and phosphorus derived from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate;
wherein the sand comprises one or more of river sand, machine-made sand (from basalt or granite, and desalinated sea sand;
wherein the superplasticizer is selected from polycarboxylate superplasticizer and naphthalene-based superplasticizer.

6. The construction method for the ecological riprap breakwater according to claim 1, wherein the concentration period of settlement is determined based on oyster larvae in metamorphosis.

7. The construction method for the ecological riprap breakwater according to claim 1, wherein round holes with the diameter of 3-5 mm are reserved in the concrete settlement substrate during molding.

8. The construction method for the ecological riprap breakwater according to claim 1, wherein the first rope, the second rope, the first plurality of ropes, and the second plurality of ropes is selected from a coir rope, a glass fiber rope and a basalt fiber rope.

9. The construction method for the ecological riprap breakwater according to claim 1, wherein the concrete settlement substrate for the oysters is prepared from the following components, by weight: 0.6-3.0% of a dark pigment, 21.8-34.5% of a cementitious material, 24.6-37.5% of lightweight coarse aggregate, 15.8-29.6% of lightweight fine aggregate, 8.4-16.4% of water, and 0.03-0.18% of a superplasticizer.

10. The construction method for the ecological riprap breakwater according to claim 1, wherein the concrete settlement substrate for the oysters is prepared from the following components, by weight: 0.4-2.35% of calcium carbonate powder, 21.8-34.5% of a cementitious material, 24.6-37.5% of lightweight coarse aggregate, 15.8-29.6% of lightweight fine aggregate, 8.4-16.4% of water, and 0.03-0.18% of a superplasticizer.

11. The construction method for the ecological riprap breakwater according to claim 1, wherein the concrete settlement substrate for the oysters is prepared from the following components, by weight: 0.4-2.35% of biological calcium powder, 21.8-34.5% of a cementitious material, 24.6-37.5% of lightweight coarse aggregate, 15.8-29.6% of lightweight fine aggregate, 8.4-16.4% of water, and 0.03-0.18% of a superplasticizer.

12. The construction method for the ecological riprap breakwater according to claim 1, wherein the concrete settlement substrate for the oysters is prepared from the following components, by weight: 0.6-3.0% of a dark pigment, 0.4-2.35% of bovine bone powder, 21.8-34.5% of a cementitious material, 24.6-37.5% of lightweight coarse aggregate, 15.8-29.6% of lightweight fine aggregate, 8.4-16.4% of water, and 0.03-0.18% of a superplasticizer.

* * * * *